(12) United States Patent
Maeda et al.

(10) Patent No.: US 6,339,576 B2
(45) Date of Patent: Jan. 15, 2002

(54) INFORMATION RECORDING MEDIUM WHICH INDICATES INFORMATION ACCORDING TO THE WOBBLING OF A TRACK AND INFORMATION RECORDING AND REPRODUCING APPARATUS

(75) Inventors: Takeshi Maeda, Kokubunji; Harukazu Miyamoto, Kodaira, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/777,894

(22) Filed: Feb. 7, 2001

Related U.S. Application Data

(60) Continuation of application No. 09/444,994, filed on Nov. 23, 1999, now abandoned, which is a division of application No. 08/955,368, filed on Oct. 21, 1997, now Pat. No. 6,069,870.

(30) Foreign Application Priority Data

Oct. 22, 1996 (JP) .............................................. 8-279424
Apr. 21, 1997 (JP) .............................................. 9-102938

(51) Int. Cl.$^7$ ................................................. G11B 7/00
(52) U.S. Cl. ..................................... 369/111; 369/275.4
(58) Field of Search ........................... 369/44.13, 53.26, 369/111, 116, 119, 124.14, 275.3, 275.4, 47.37, 47.38, 53.3

(56) References Cited

U.S. PATENT DOCUMENTS 5,104,404 A  4/1992  Ohira
5,463,614 A  10/1995 Morita
5,537,373 A  7/1996  Horikiri
5,539,724 A  7/1996  Ohtomo
5,615,185 A  3/1997  Horikiri
5,662,988 A  9/1997  Nakayama et al.

FOREIGN PATENT DOCUMENTS

| EP | 0 347 858 A2 | 11/1993 |
| JP | 49-103515 | 10/1974 |
| JP | 61-151843 | 7/1986 |
| JP | 5-314538 | 11/1993 |
| JP | 7-14173 | 1/1995 |
| JP | 7-161045 | 6/1995 |
| JP | 7-296389 | 11/1995 |
| JP | 8-167169 | 6/1996 |

OTHER PUBLICATIONS

"A New Disc Format and Land/Groove Recording on a MSR Disc", M. Mieda et al, International Symposium on Optical Memory 1995 (ISOM '95), Technical Digest, Fr–D4, pp. 167–168.

*Primary Examiner*—Paul W. Huber
(74) *Attorney, Agent, or Firm*—Antonelli, Terry, Stout & Kraus, LLP

(57) ABSTRACT

A manufacturing method for a stamper for an information recording medium includes driving an original disk, irradiating a beam for exposure on the original disk, performing exposure to light in a shape of a track by scanning the beam in a radial direction of the original disk, controlling a width of the scanning so that borders on both sides of the track are shifted in phase from each other with a phase difference. The original disk is developed to form the track, and a shape of a surface of the original disk is transferred to a stamper.

10 Claims, 29 Drawing Sheets

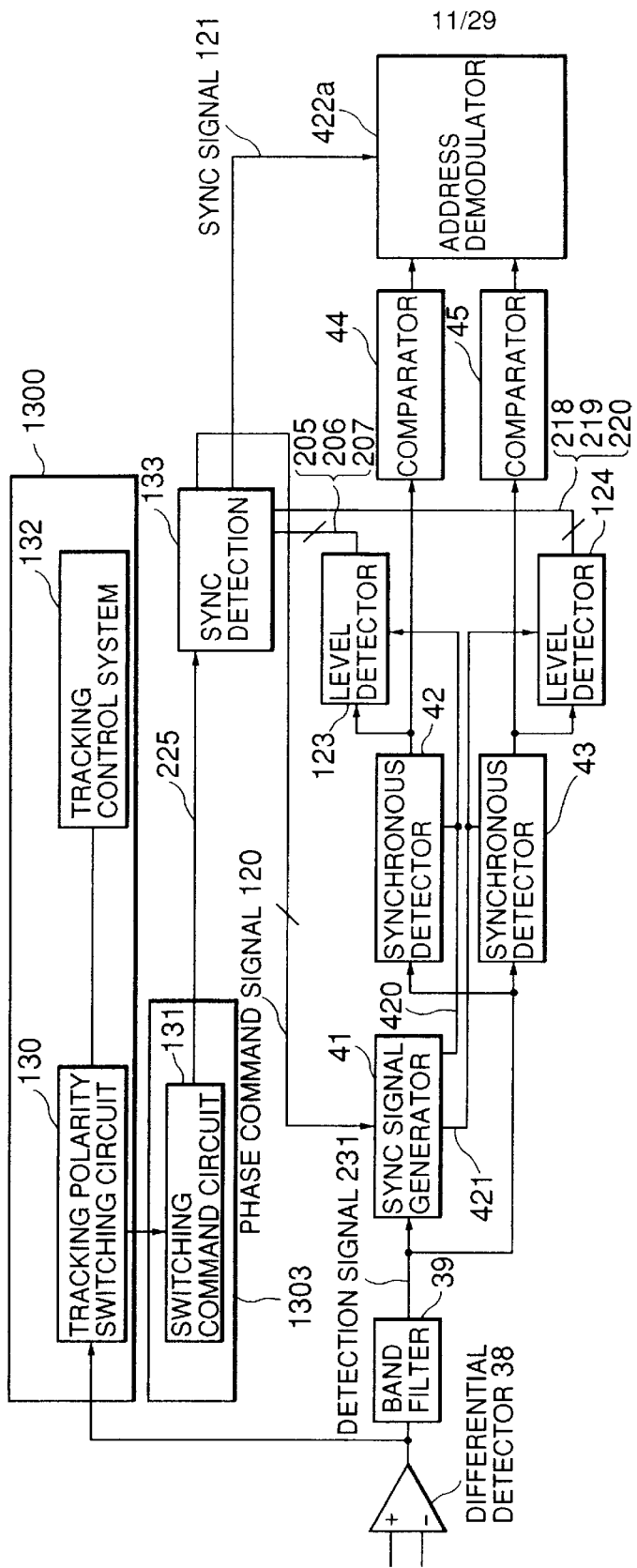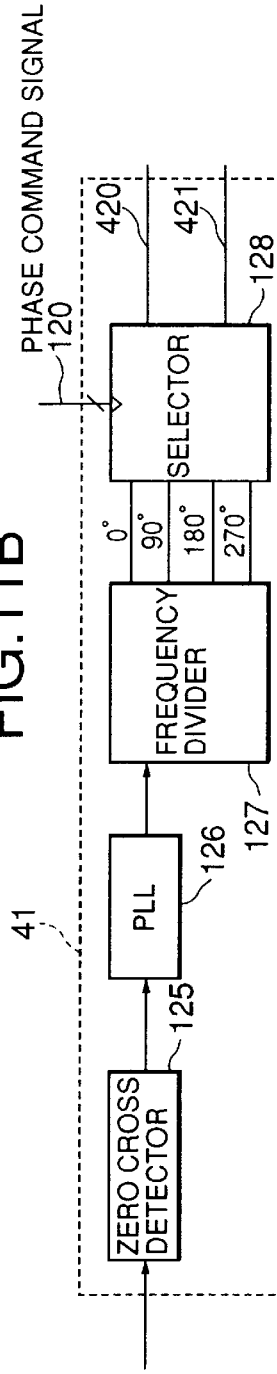
FIG.11A
FIG.11B

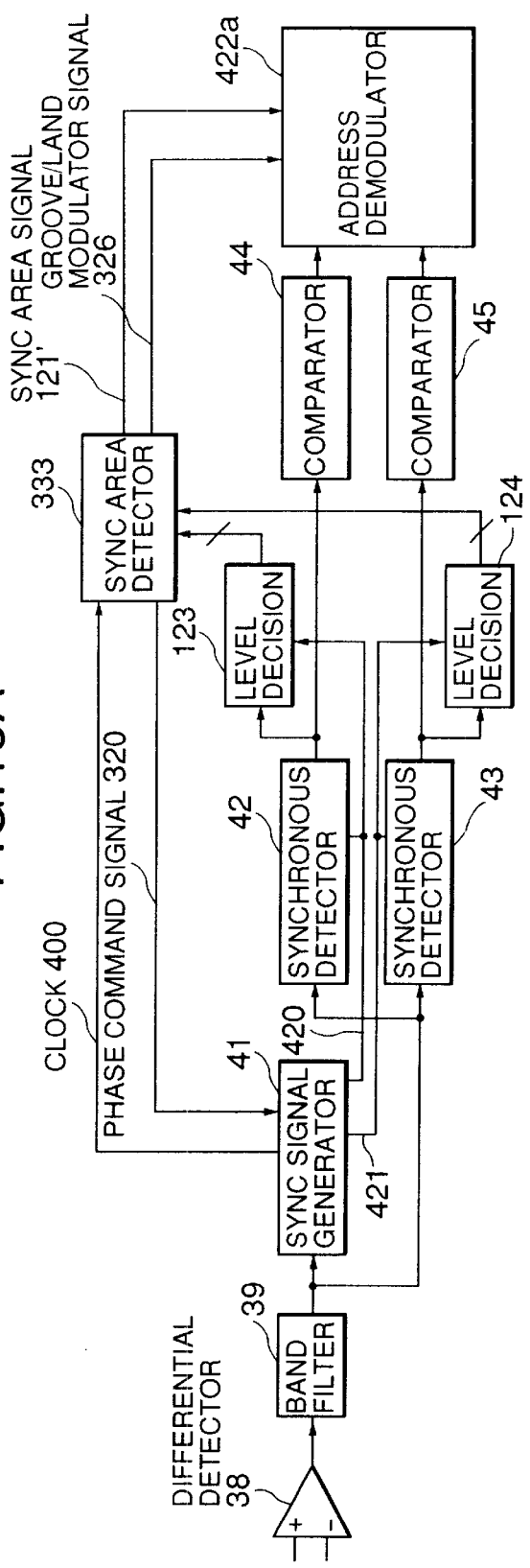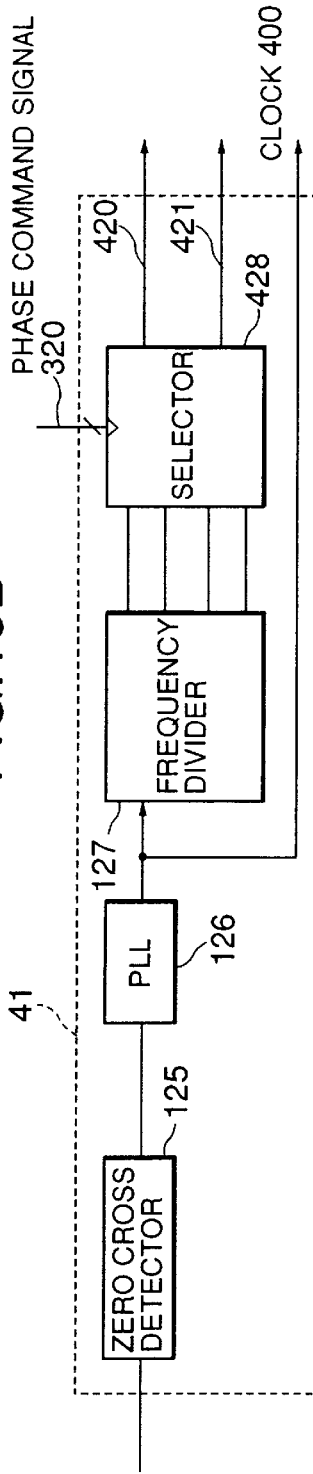

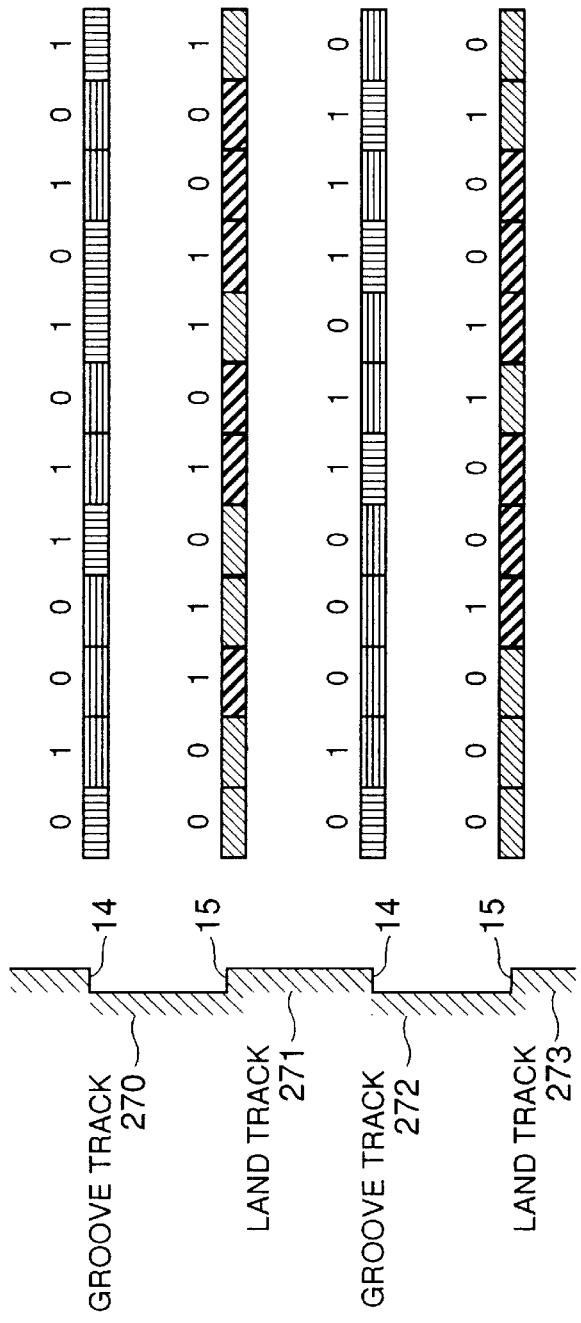

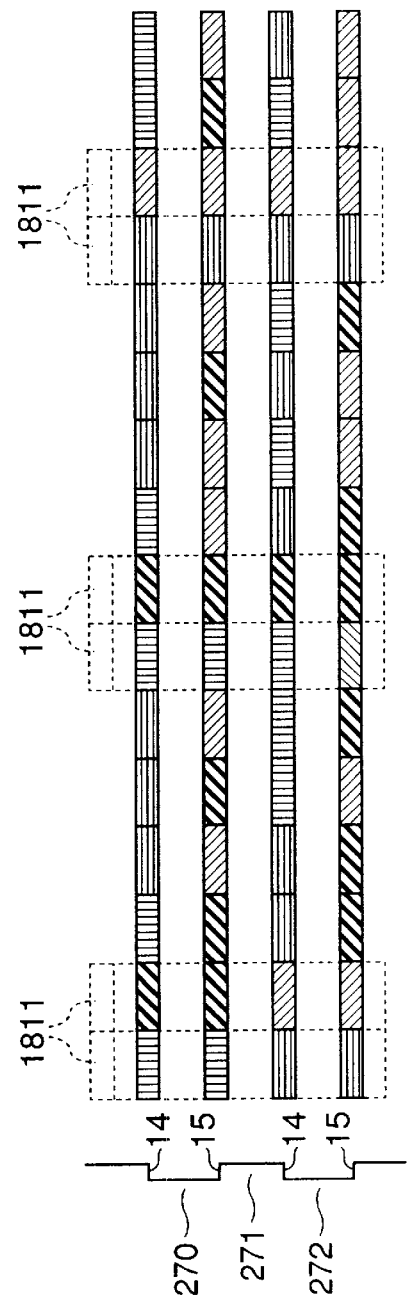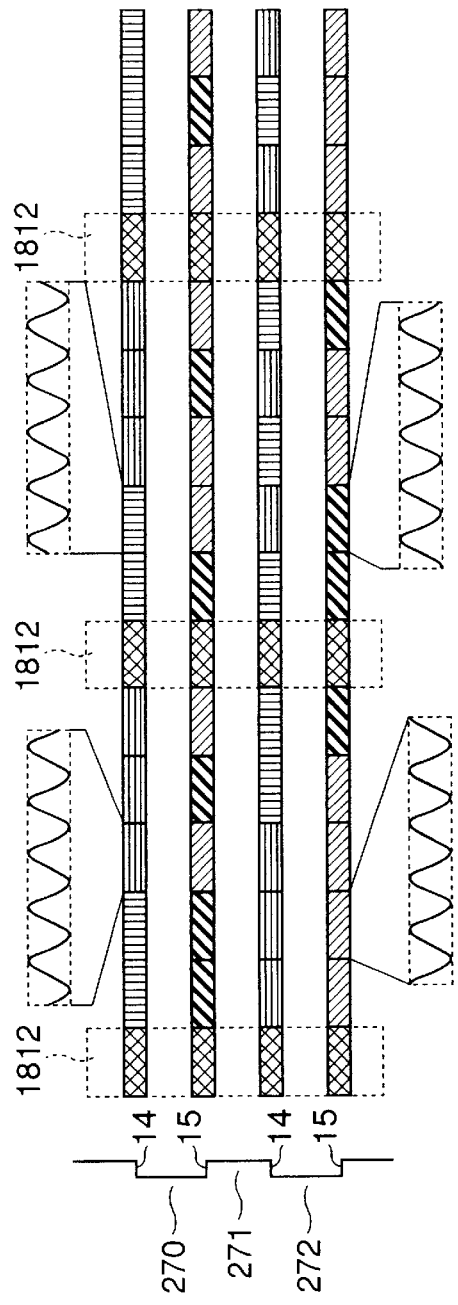

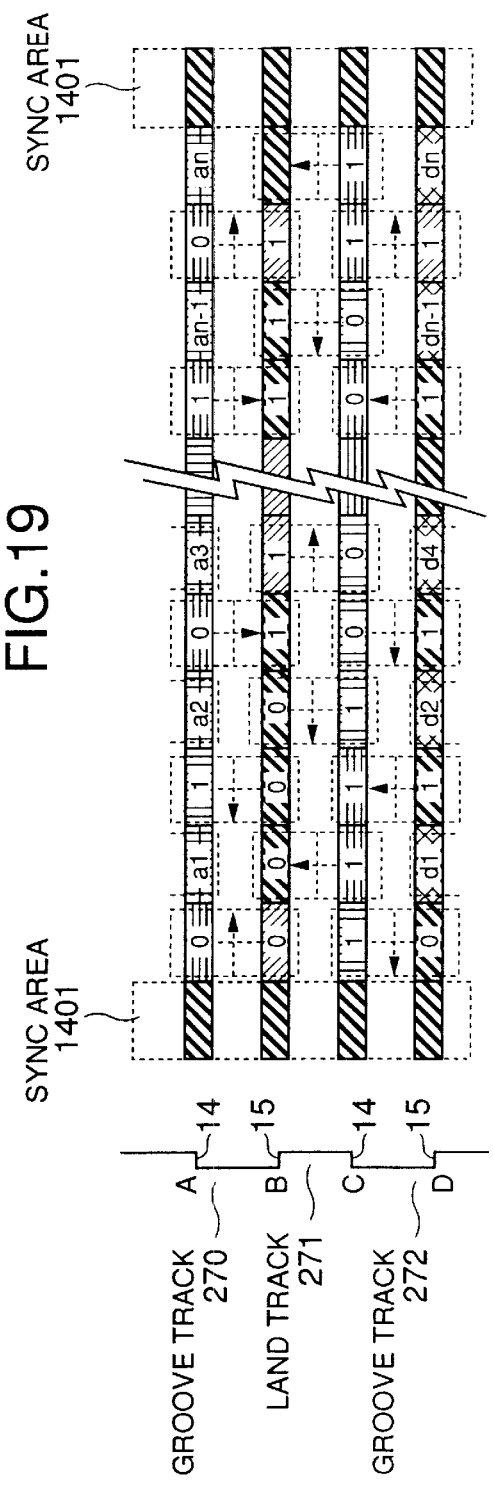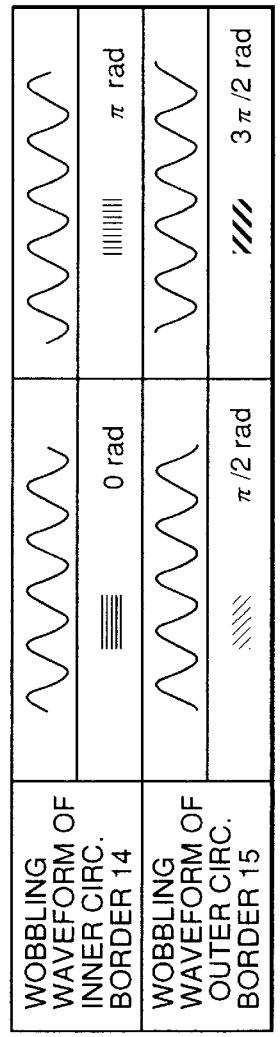
FIG.19

INFORMATION RECORDING MEDIUM WHICH INDICATES INFORMATION ACCORDING TO THE WOBBLING OF A TRACK AND INFORMATION RECORDING AND REPRODUCING APPARATUS

CROSS-REFERENCE TO RELATED APPLICATIONS

This is a continuation of U.S. application Ser. No. 09/444,994, filed Nov. 23, 1999, now abandoned, and relates to applications U.S. application Ser. No. 09/444,993, filed Nov. 23, 1999 and U.S. application Ser. No. 09/444,995, filed Nov. 23, 1999, which are divisional applications of parent U.S. application Ser. No. 08/955,368, filed Oct. 21, 1997, now U.S. Pat. No. 6,069,870, the subject matter of which is incorporated by reference herein.

BACKGROUND OF THE INVENTION

1. Field of the Invention

The present invention relates to an information recording medium for optically recording or reproducing information, and an information recording and reproducing apparatus for recording or reproducing information on the information recording medium.

2. Prior Art

Optical disks are known, such as compact disks and magnetooptical disks, which optically record information by changes in the reflectance factor or changes in the polarization direction of reflected light, for example. A track 261 is formed in a spiral form on the surface of an optical disk as shown in FIG. 26. Along this track on the optical disk, information marks caused by the changes in the reflectance factor or the changes in the polarization direction of the reflected light are formed to record information on a surface of an optical disk 260.

A circuit of the track 261 is divided into an integral number of blocks 262. Each block 262 is divided according to a predetermined disk format into a plurality of areas, on each of which user data and control information for use in recording or reproducing user data is recorded. The blocks are also called sectors.

As an example of disk formats, the format of a rewritable magnetooptical disk 130 mm in diameter and with a recording capacity of 1.3 GB, standardized by ISO (International Standardization Organization) will be described with reference to FIG. 25. In FIG. 25, the numbers given below the information areas denote the numbers of bytes of the related items of information.

The capacity for one block (sector) 262 is 1410 bytes. One block includes at its leading end a preformatted header segment 250 of 63 bytes. In the format of FIG. 25, information in the preformatted header 250 is recorded with information marks consisting of prepits formed at the time of manufacture of the optical disk. Information other than that in the preformatted header segment 250 is not preformatted, but is recorded with rewritable information marks.

The preformatted header segment 250 includes a sector mark segment (SM) 256 to record information to indicate the leading end of this block, a VFO segment 257, an address mark segment (AM) 258, an address information segment (ID) 259, and a PA segment 267. The address information segment (ID) 259 has recorded therein information to indicate the location of this block 262 on the optical disk 260, and has a self-clocking function to generate a clock signal from its own information during reproduction. The VFO segment 257 has recorded therein information to designate a specific frequency for pull-in when generating a clock signal for the address information segment 259. The AM segment 258 has recorded therein information to indicate that there is an address information segment (ID) 259 in the subsequent segment. In each preformatted header, a VFO segment 257, an AM segment 258, and an address information segment 259 are arranged twice in succession, and the PA segment 267 is provided to adjust the length of the information marks in the whole area of the preformatted header segment 250.

Behind the preformatted header segment 250, an ALPC-GAPS segment 251 is provided. The ALPC-GAPS segment 251 includes a FLAG segment 265 to show whether or not data has been recorded in a data field 254, an ALPC segment 266 for recording information to control the power of the laser in recording, and GAP segments 264 as buffer portions placed between the segments.

Following this, a data field 254 for recording user data is provided. The data field 254 also has a self-clocking function. Before the data field 254, a VFO segment 252 and a SYNC segment 253 are provided. In the VFO segment 252, a specific frequency is recorded for pull-in for generating a clock signal in synchronism with data when reproducing data from the data field 254. In the SYNC segment 253, information about timing for demodulating information during reproduction is recorded.

In the data field 254, RESYNC segments 268 and data segments 267 are alternately provided. The RESYNC segments 268 are provided to re-attain synchronism when loss of synchronism occurs between data and clock during the self-clocking operation. Data 267 consists of information 1040 bytes long, which includes user data of 1024 bytes, a CRC segment to check if user data is read correctly, and a DMP segment to show where error data is when error data occurs due to corruption of data, and ECC codes of 160 bytes added to correct the error data. When recording, two bytes of RESYNC 268 are added for every 30 bytes of data 267.

In the rear of the data field 254, a buffer segment 255 is provided. The clock for recording information has a fixed frequency, and therefore when a variation occurs in the rotating speed of the motor to drive the optical disk or when the center of the track 261 deviates from the center of rotation, the linear velocity of the laser beam for writing on the track 261 varies, but the buffer 255 absorbs this variation.

In the conventional format standardized by ISO, in one block 262 of 1410 bytes, the user data capacity at which the user can record data is 1024 bytes in the data field 254. Therefore, the recording efficiency of user data is 1024/1410, namely, 72.6%. The remaining 27.4% is accounted for by the address information segment 259 and control signals of VFO segments 257, 252, when reproducing so that the recording efficiency of user data is not so high.

For this reason, to improve the recording efficiency of user data, JP-A-49-103515 discloses a technique by which the track is made to fluctuate with minute waves, and address information of the track is recorded by the variation of the frequency of the waves. Specifically, the track is formed during the manufacture of the optical disk such that the center of the track is made to fluctuate minutely (by wobbling) in the width direction of the track, the frequency of this wobbling is varied along the longitudinal direction of the track, by which the address information of the track is represented. Since the address information is recorded by the wobbling of the track, it is not necessary to record the address information with the information marks, and accordingly the area for recording user data with the information marks can be increased. Thus, the recording efficiency of user data can be enhanced.

However, the above technique in JP-A-49-103515 is unable to use a track width smaller than the diameter of the beam spot of the laser beam in reproduction. The reason for this is that if the track width is narrower than the beam spot, the leakage of information from adjacent tracks increases, making it difficult to reproduce information correctly.

In literature titled International Symposium on Optical Memory 1995 (ISOM '95) TECHNICAL DIGEST Fr-D4 "A NEW DISC FOR LAND/GROOVE RECORDING ON AN MSR DISC, a land/groove track structure was proposed in which, as shown in FIG. 1, grooves 3 are formed mutually separated by a fixed space on the surface of the optical disk, and while those grooves 3 are used as tracks, lands 2 between the grooves 3 are also used as tracks. In this structure, since the tracks on the lands 2 are adjacent to the tracks in the grooves 3, there is a level difference corresponding to the depth h between the adjacent tracks. Therefore, as shown in FIG. 1, the diameter of the reproducing beam spot 1 of the laser beam is larger than the track width in the reproduction process, and also when the reproducing beam spot 1 extends over the adjacent tracks on both sides of the track from which data is reproduced, with the phases of reflected beams from the adjacent tracks, a phase difference corresponds to the difference in the height h of the tracks, thus making it possible to prevent the leakage of information from the adjacent tracks. Therefore, the track width can be made smaller than the beam spot diameter, so that the track density can be increased. Also in this literature, as shown in FIG. 1, another technique was revealed in which the border between the land 2 and the groove 3 is made to wobble, and address information is recorded with the wobbling frequency. Also, a structure was proposed in which the track width is smaller than the reproducing beam spot, and there are always two borders between the land 2 and the groove 3 within the reproducing beam spot 1, and therefore address information is represented by wobbling only one of the two borders.

However, in the structure in that literature as shown in FIG. 1, since the part wobbles is the border between the land and the groove, the wobbling motion of the border is shared by the track on the land side and the track on the groove side. Therefore, not only when the center of the reproducing beam spot 1 is located on the land side 2 but also when the beam spot is located on the groove side, the wobbling motion of the same border is detected, and accordingly address information specified by the wobbling frequency is produced. Hence, it is impossible to decide from the address information reproduced by wobbling whether the reproducing beam spot 1 is on the track of the land side 2 or on the track of the groove side 3. If for some reason the tracking servo fails to keep track and the reproducing beam spot shifts to the adjacent track, this cannot be detected from address information, with the result that there is a possibility that information of the adjacent track is reproduced and recorded by mistake.

SUMMARY OF THE INVENTION

A first object of the present invention is to provide an information recording medium which stores address information in such a manner that information can be securely recorded or reproduced on the target track, while increasing the track density.

A second object of the present invention is to provide an information reproducing apparatus for reading information from such an information recording medium in this patent application.

To accomplish the first object mentioned above, the present invention provides an information recording medium as shown below, that is:

an information recording medium comprising:

a substrate;

a plurality of tracks formed on said substrate, said plurality of tracks including a plurality of groove tracks consisting of a plurality of grooves formed mutually spaced apart by a fixed space, and a plurality of land tracks. formed in areas between adjacent groove tracks, wherein said grooves are so formed as to represent information by wobbling waveforms of borders wobbling between said groove tracks and said land tracks, wherein the period of the wobbling waveforms of said borders is fixed, and wherein the phases of the wobbling waveforms of said borders are such that the waveforms of the opposing portions of the adjacent borders facing each other across each said track are out of phase with each other by a predetermined phase difference.

To accomplish the second object mentioned above, the present invention provides an information reproducing apparatus as shown below, that is:

an information reproducing apparatus comprising:

a rotating portion to rotate an information recording medium on which information has been recorded by wobbling said borders on both sides of a track with different phases;

a beam irradiating portion for irradiating a beam spot on said track of said information recording medium;

a photodetector for receiving a reflected beam of said beam spot from said information recording medium;

detection means for detecting a composite waveform including waveforms on said borders on both sides from the received beam intensity of said photodetector;

reference signal generating means for generating two reference signals respectively synchronized with the phases of the wobbling of said borders on both sides; and information reproducing means for separately reproducing information of the wobbling waveform of said borders on both sides by multiplying said composite waveform by said two reference signals respectively.

BRIEF DESCRIPTION OF THE DRAWINGS

FIG. 11A is a block diagram showing a circuit structure for reproducing address information on the optical disk according to a third embodiment of the present invention;

FIG. 11B is a block diagram showing a detailed structure of the synchronous signal generator 41 in FIG. 11A;

FIG. 15A is a block diagram showing a circuit structure for reproducing address information on the optical disk in the recording or reproducing method of FIG. 14;

FIG. 15B is a block diagram showing a detailed structure of the synchronous signal generator 41 of FIG. 15A;

FIG. 17A is an explanatory diagram showing a modulation rule used in the method of recording or reproducing address information on the optical disk according to a fifth embodiment of the present invention;

FIG. 17B is an explanatory diagram showing examples of data each bit on the track borders, modulated by the recording or reproducing method of FIG. 17A;

FIG. 18A is an explanatory diagram showing an example in which timing data 1800 is included in address information in the fifth embodiment shown in FIGS. 17A, 17B;

FIG. 18B is an explanatory diagram showing an example in which timing data 1800 is included in address information in the fifth embodiment shown in FIGS. 17A, 17B;

FIG. 19 is an explanatory diagram showing an example of address information recorded by the recording or reproducing method of FIGS. 14A, 14B;

PREFERRED EMBODIMENTS OF THE INVENTION

A first embodiment of the present invention will be described.

To begin with, an optical disk according to the first embodiment of the present invention will be described.

Figure 1:
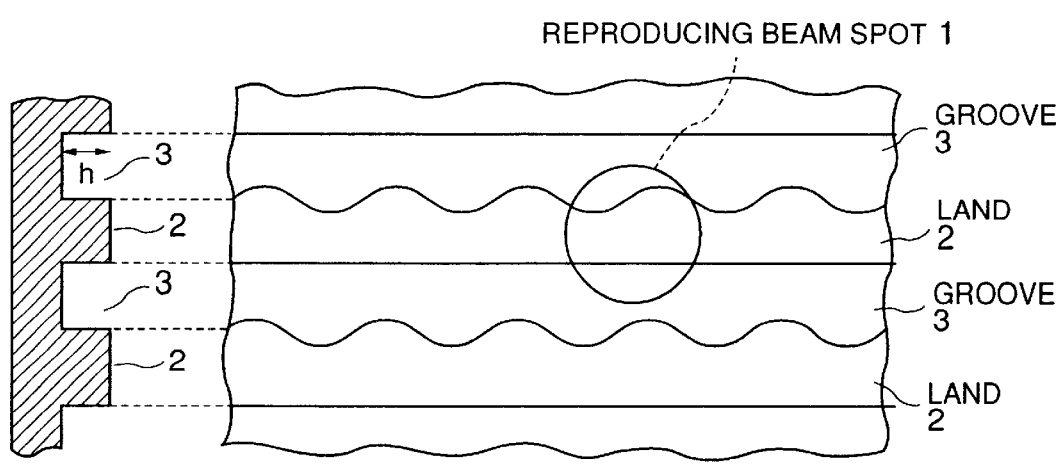
FIG. 1 is an explanatory diagram showing the track structure of the land/groove method of the conventional optical disk.
Figure 2:
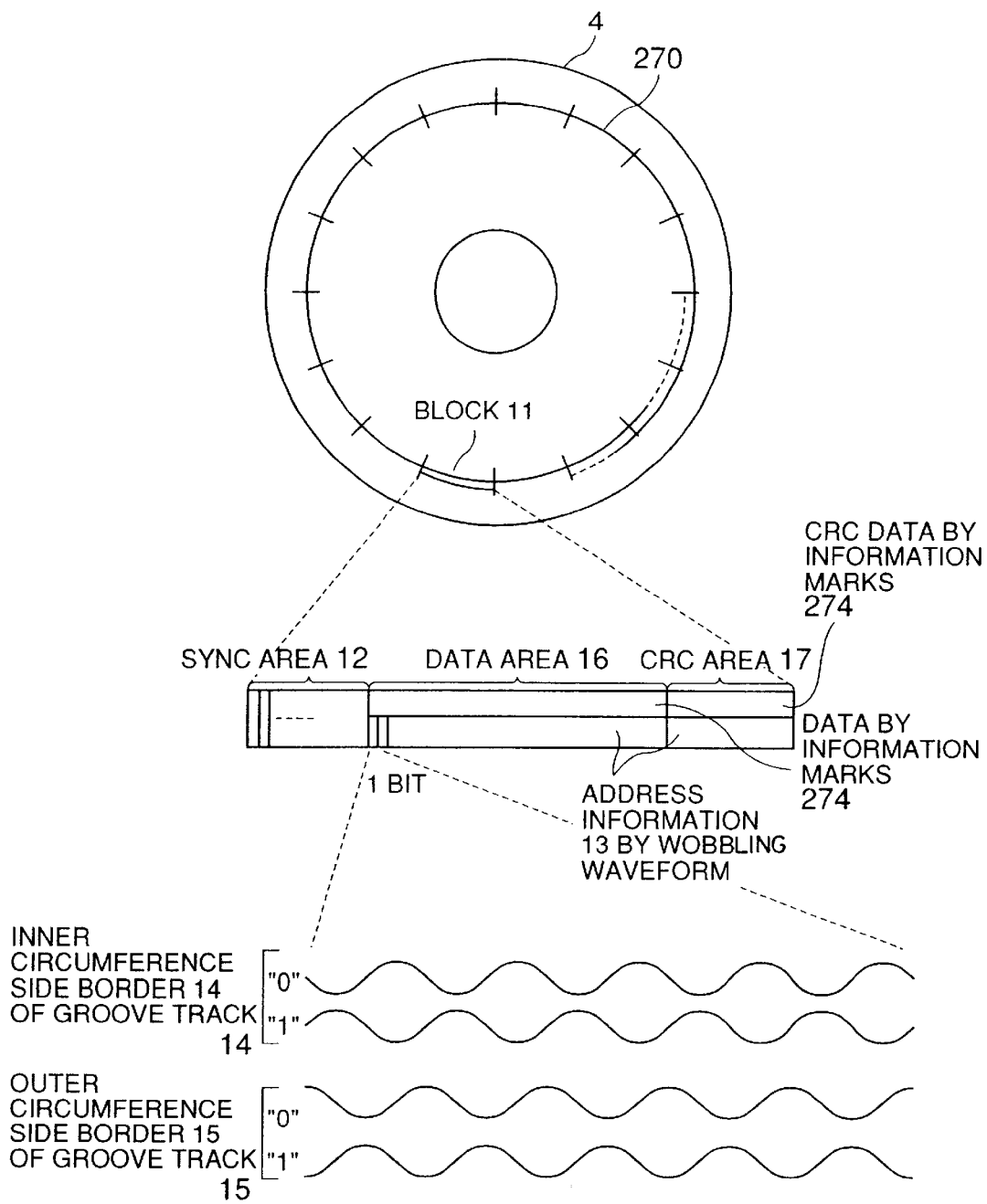
FIG. 2 is an explanatory diagram showing the wobbling waveforms of the borders of tracks 270, etc. of the optical disk according to a first embodiment of the present invention.
Figure 27:
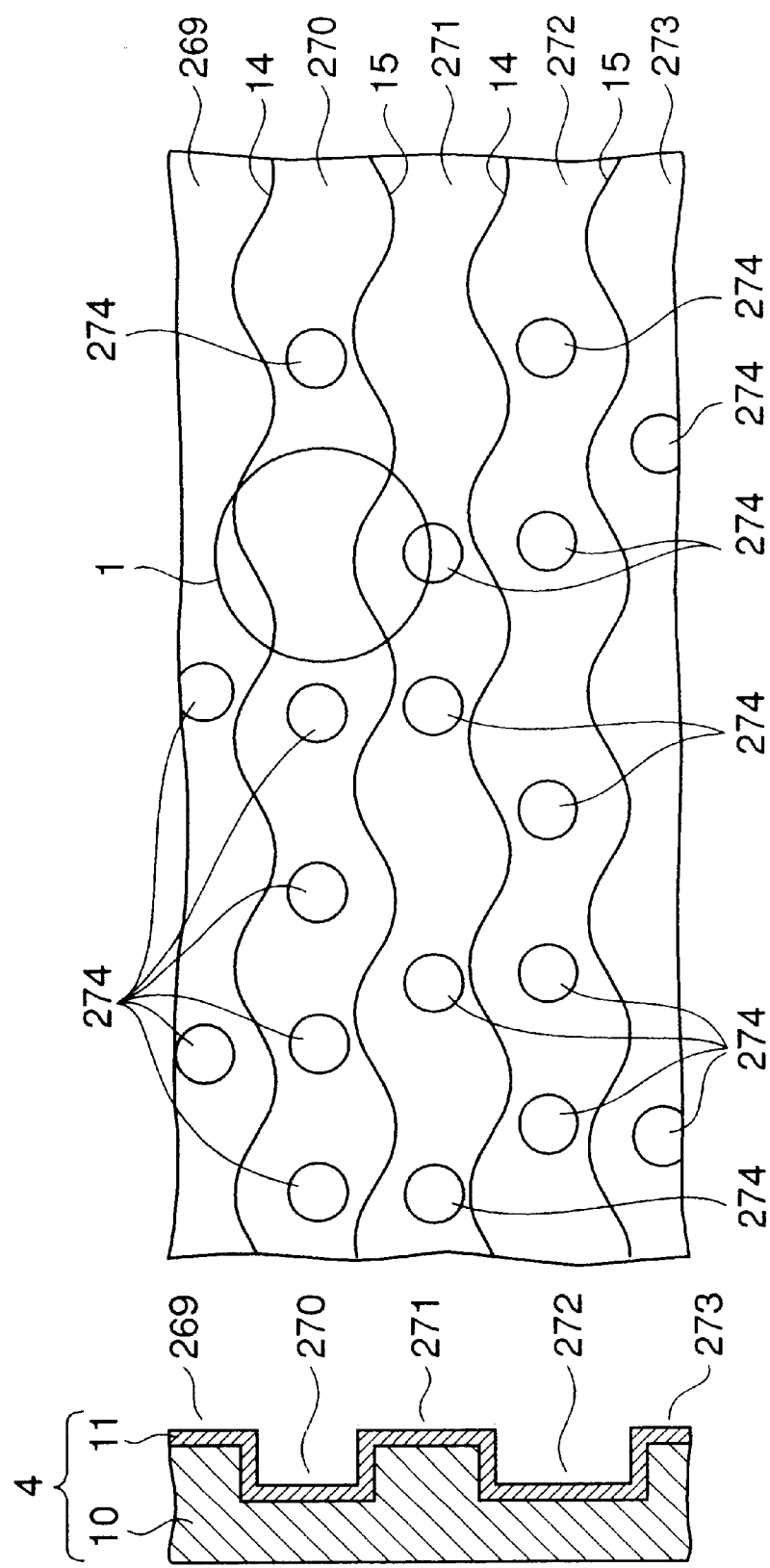
FIG. 27 is an explanatory diagram showing the information mark and wobbling waveforms of the borders of tracks on the optical disk according to the first embodiment of the present invention.

As shown in FIGS. 2 and 27, an optical disk 4 according to the first embodiment is formed as an optical disk of the land/groove track structure which uses grooves 270, 272, etc. and lands 269, 271, 273, etc. as the tracks formed mutually spaced a fixed distance apart in a spiral form with respect to the center of the disk. As shown in FIG. 2, one circuit of the track 270, for example, is divided into an integral number of blocks 11, and each block 11 is divided into a synchronous (sync) area 12, a data area 16, and a CRC area 17. The blocks 11 may be provided by a generally well-known method. For example, the CAV (Constant Angular Velocity) method may be used in which the number of blocks 11 per circuit of the track is the same from the innermost track to the outermost track of the optical disk 4, or the M-CAV (Modified CAV) method may be used in which the optical disk 4 is divided into some zones in the radial direction, and the same number of blocks 11 are in each circuit of the tracks in the same zone, and the number of blocks 11 per circuit of the track is greater for outer zones and smaller for inner zones.

Data in the data area 16, as shown in FIG. 27, is recorded with information marks formed along the track 270, etc.

Address information 13 on the tracks 270, etc. is recorded by wobbling the borders of the tracks 270, etc. of the data area 16. Therefore, data using information marks 274 and the address information 13 using wobbling of the border of the track are recorded simultaneously in the same area.

Meanwhile, the information marks 274 of the optical disk according to the first embodiment are formed by heating the recording film 11 of the optical disk 4 by condensing the laser beam on the surface of the optical disk as described later, and the information mark differs in light reflectance factor from that of the surrounding area. However, the optical disk 4 according to the present invention is not limited to the type in which the information marks 274 are formed as thermally formed traces having a different reflectance factor from that of the surrounding area. Optical disks may be used which apply other kinds of information marks, such as a mark whose direction of polarization differs from that of the surrounding area, or a mark formed by other methods.

The sync area 12 is used to generate a reference signal and a clock signal used when reading data in the address information 13 and the data area 16. The composition of the sync area will be described later. The CRC area 17 has recorded therein information used to check whether user data is read correctly. This information is the same as in the CRC segment used in the conventional format in FIG. 25. Information in the CRC area 17 is recorded with the information marks 274. Note that in the first embodiment, also in the CRC area 17, like in the sync area 12, address information 13 is recorded by wobbling the borders 14, 15 of the tracks 270, etc.

In the first embodiment, address information 13 is recorded with different wobbling waveforms, as shown in FIG. 27, which are generated by wobbling the borders 14, 15 of the tracks 270, etc. of the data area 16 and the CRC area 17 in different wobbling waveforms as shown in FIG. 27. Address information 13 indicates where the borders 14,15 are located on the optical disk 4. Therefore, even if there is only one groove track 270, the wobbling waveform differs between the border 14 at the inner circumference side and the border 15 at the outer circumference side of the groove track 270.

Figure 3:
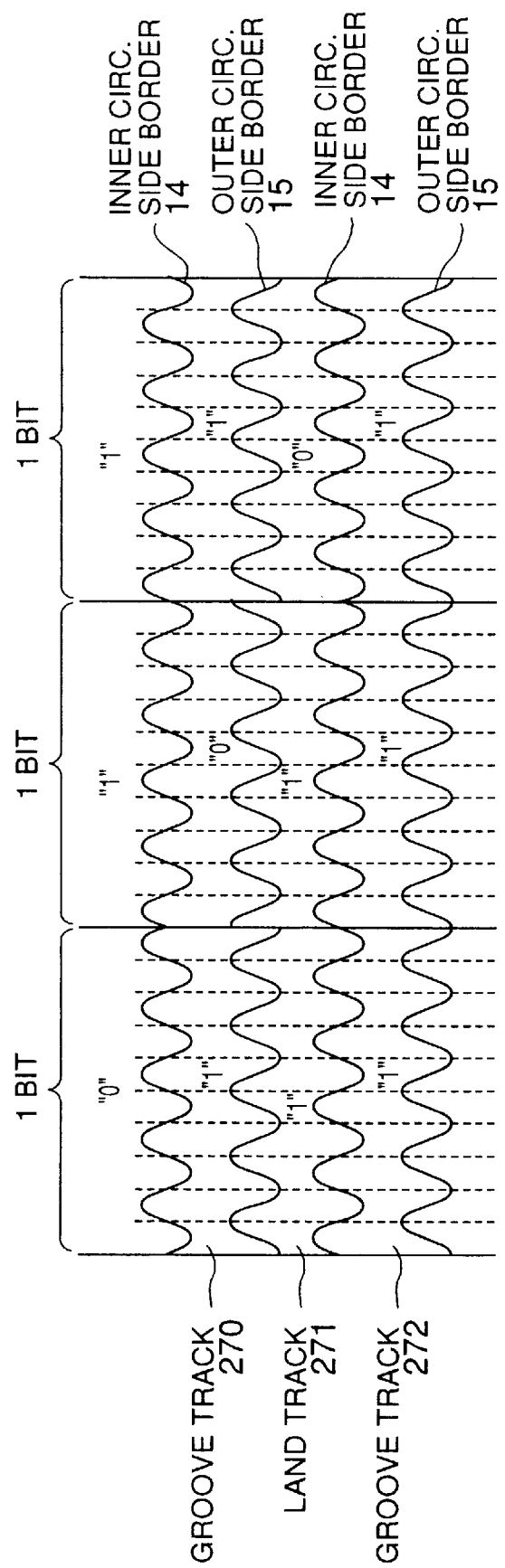
FIG. 3 is an explanatory diagram showing the wobbling waveforms of the borders of tracks 270, etc. of the optical disk according to the first embodiment of the present invention.

Specifically, as shown in FIG. 3, the borders 14, 15 of the tracks 270, etc. are partitioned, and each subdivision is denoted as one bit, and data "0" or data "1" are represented by the wobbling waveforms. Meanwhile, the number of bits in each block is fixed regardless of whether the block is located at the track on the inner circumference side or at the track on the outer circumference side. The number of periods of the wobbling waveforms should be decided so that a predetermined number of waves are included in each bit area (five periods in FIG. 3). The phase of the wobbling waveforms should be decided so that in a given bit, the wobbling waveform of data "0" is identical in oscillation period with the wobbling waveform of data "1", but those waveforms are 180 degrees out of phase with each other (a phase difference of 180 degrees). However, the phase of the wobbling waveform on the border 14 on the inner circumference side of the groove track 270 or 272 should invariably be set to lag or lead by on that of the wobbling waveform on the border 15 on the opposite, outer circumference side of the track, by 90 degrees, in other words, those waveforms should have an orthogonal relationship. As the phases are set as described above, even seen from the land track 271, the wobbling waveform on the border 15 on the inner circumference side lags or leads on that of the wobbling waveform on the border 14 on the opposite, outer circumference side by 90 degrees in phase, in other words, those waveforms have an orthogonal relationship. Because the adjacent bits represent different pieces of data because the items of the wobbling waveforms are set for each bit, when the adjacent bits represent different data, that is, when the adjacent bits represent "1" "0" or "0" "1", the wobbling waveform is discontinues on the border over the two bits.

FIG. 3 shows the wobbling waveforms of the borders 14, 15 of the tracks 270, etc. In FIG. 3, the tracks 270, 271, and 272 are drawn in straight lines for the sake of convenience, and they are concentric on an actual optical disk 4. As shown in FIG. 3, on the groove track 270, data "011" is represented on the border 14 on the inner circumference side, and data "101" is represented on the border 15 on the outer circumference side by wobbling waveforms. Data "110" is represented by wobbling of the border on the inner circumference side of the groove track 272, while data "111" is represented on the outer circumference side.

As has been described, by recording different items of address information 13 on the track, which indicate the respective locations of the borders 14, 15 on the optical disk 4, it is therefore possible to read address information 13 of the borders 14, 15 on both sides of the track when reproducing the information marks 274. For example, by moving the reproducing beam spot 1 along the groove track 270 to read information on the groove track 270, it is possible to read address information "011" from the border 14 on the inner circumference side and "101" from the border 15 on the outer circumference side simultaneously with data by the information marks 274. By a combination of "011" and "101", it can be confirmed that the track irradiated by the reproducing beam spot 1 is the groove track 270. If the tracking servo should fail to keep track and it becomes obscure which track the reproducing beam spot 1 is irradiating, but so long as address information 13 which is detected is a combination of "101" and "110", it can be known that the reproducing beam spot 1 is shifted to the land track side 271. Thus, it is easy to decide which the beam spot 1 is irradiating, the groove track, such as 270 or the land track, such as 271.

Meanwhile, the wobbling waveforms are formed by forming grooves, 270, 272, and so on, such that the borders of the grooves assume wobbling waveforms. This will be described later. Though FIG. 3 shows that there are waveforms of five periods in one bit, the number of periods is not limited to five, but may be any number.

Figure 7A:
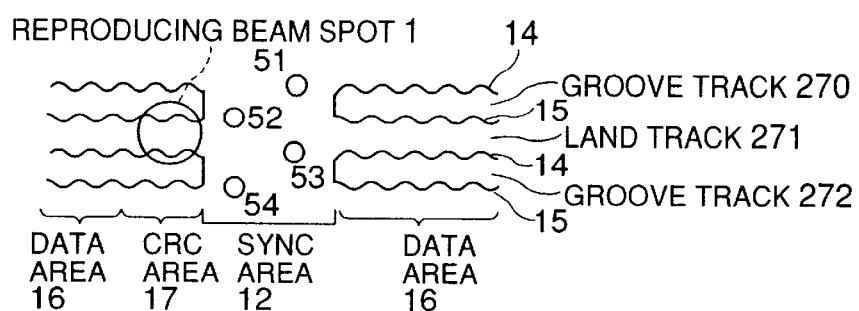
FIG. 7A is an explanatory diagram showing an example of the shape of the sync area 12 on the optical disk according to the first embodiment of the present invention.
Figure 7B:
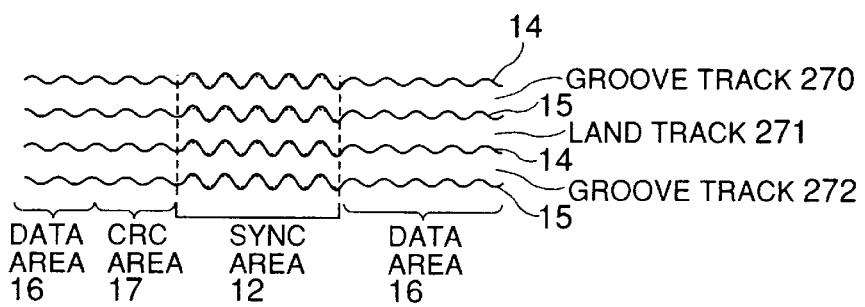
FIG. 7B is an explanatory diagram showing an example of the shape of the sync area 12 on the optical disk according to the first embodiment of the present invention.
Figure 7C:
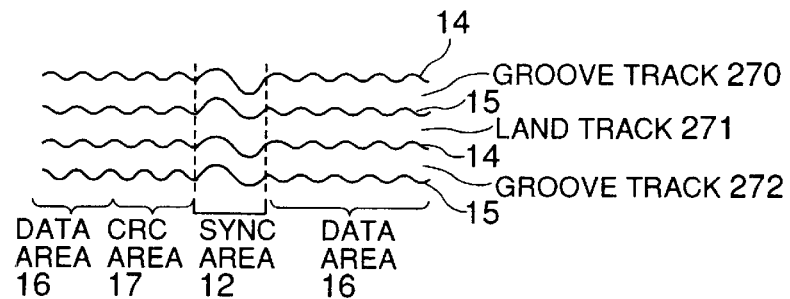
FIG. 7C is an explanatory diagram showing an example of the shape of the sync area 12 on the optical disk according to the first embodiment of the present invention.

For an actual structure of the sync area 12, any of the structures of FIGS. 7A, 7B and 7C may be used. FIG. 7A shows a structure having optically identifiable marks 51, 52, 53 and 54. In this case, in the sync area 12, grooves, such as tracks 270, 272, are not formed in the sync area 12, and the sync area 12 is flush with the surface of land tracks, such as 271. The marks, such as 51, are pits formed on the surface, and are formed simultaneously in the process of forming grooves for groove tracks 270, 272 during the manufacture of the optical disk 4. Those marks 51, 52, 53 and 54 are arranged close to the borders 14, 15 of the tracks, 270 etc., and are shared by the adjacent tracks. For example, the sync area 12 of the groove track 270 has the marks 52, 53, while the sync area 12 of the groove track 272 has the marks 53, 54. The space in the track-lengthwise direction of two marks, such as 51, 52 etc. in the sync area 12 is formed so as to be synchronous with the wobbling waveforms of the address signal. Therefore, by dividing the frequency of a signal obtained from the space between the marks, such as 51, of the sync area 12, a reference signal synchronous with the wobbling waveform can be generated. In addition, two marks, such as 51, 52 are arranged not in the center of the track 270 etc. but in the vicinity of the border 14, 15 so that those marks wobble to the left and right with respect to the center of the track 270 etc. Therefore, by using a well-known sampling-servo method in order to find a level difference between the marks 51 and 52, a shift of the reproducing beam spot 1 from the track center can be known. Thus, according to a signal from the sync area 12, it is possible to correct the shift of address information 13 from the track.

The sync areas 12 of structures in FIGS. 7B and C have groove tracks 270, 272 formed therein to represent sync signals by the wobbling waveforms at the borders 14, 15 of the tracks, such as 270. In the sync area 12 in FIG. 7B, the border 14 on the inner circumference side and the border 15 on the outer circumference side of the groove track 270 etc. have wobbling waveforms of the same period and phase. The wobbling waveforms in the sync area 12 are made to have a larger amplitude than that of address information 13 so that the wobbling waveforms in the sync area 12 can be detected easily. In this structure, regardless of where the reproducing beam spot 1 is irradiating, the groove tracks 270, 272, or the land track 271, or the intermediate regions, the sync area 12 can be detected by detecting a region having the wobbling waveforms of the sync area. In the structure in FIG. 7B, the sync area 12 has a length for five periods equal to the length of other areas. In the structure in FIG. 7C, in order to increase the proportion of the data area 13 in the block 11 by decreasing the length of the sync area 12, the wobbling waveforms of the sync area 12 are set as one period, but instead of this, have a larger amplitude than in FIG. 7B.

Figure 4:
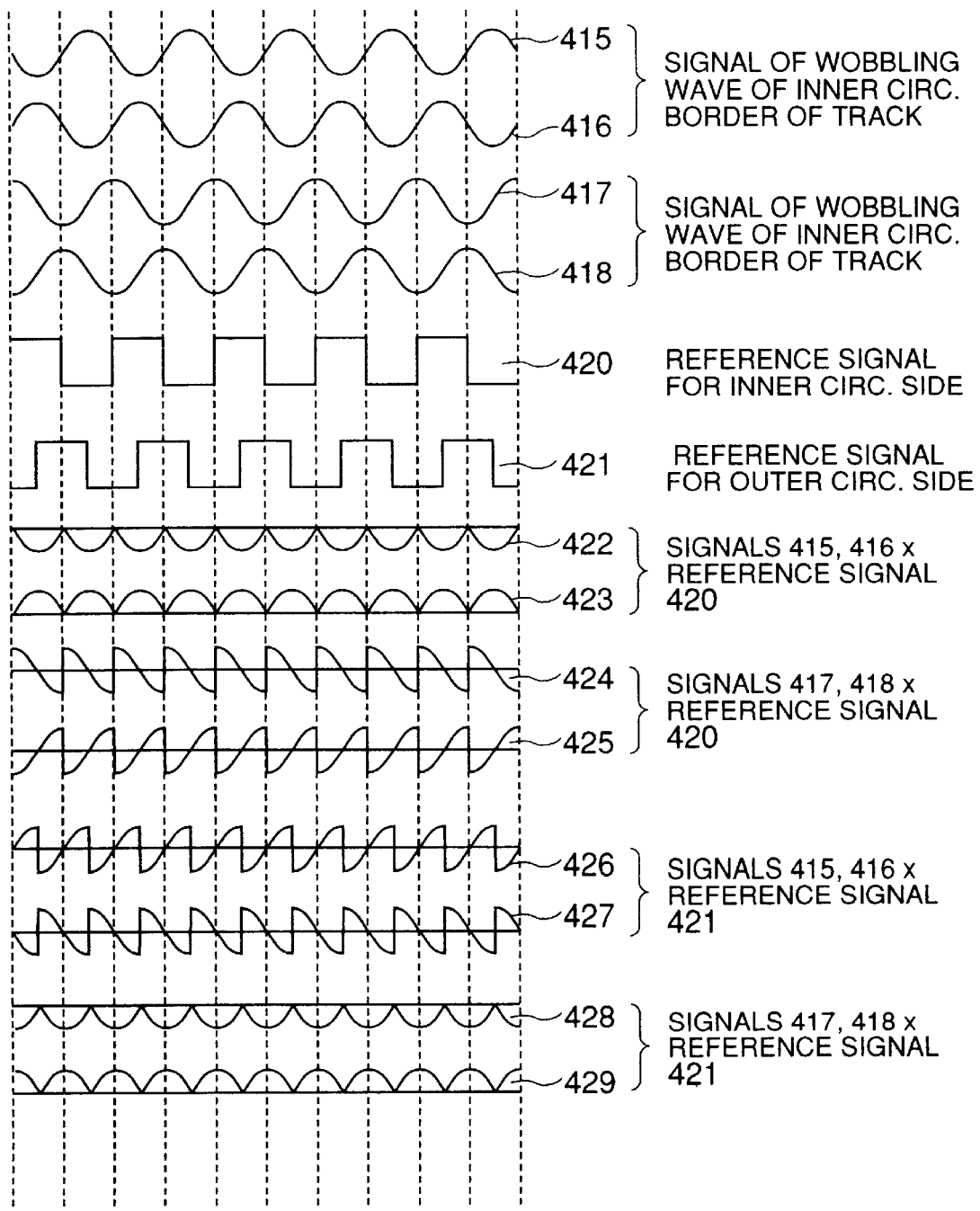
FIG. 4 is an explanatory diagram showing the principle of reproducing address information from the wobbling waveforms of the borders of the tracks 270, etc. of the optical disk of the first embodiment of the present invention.
Figure 5A:
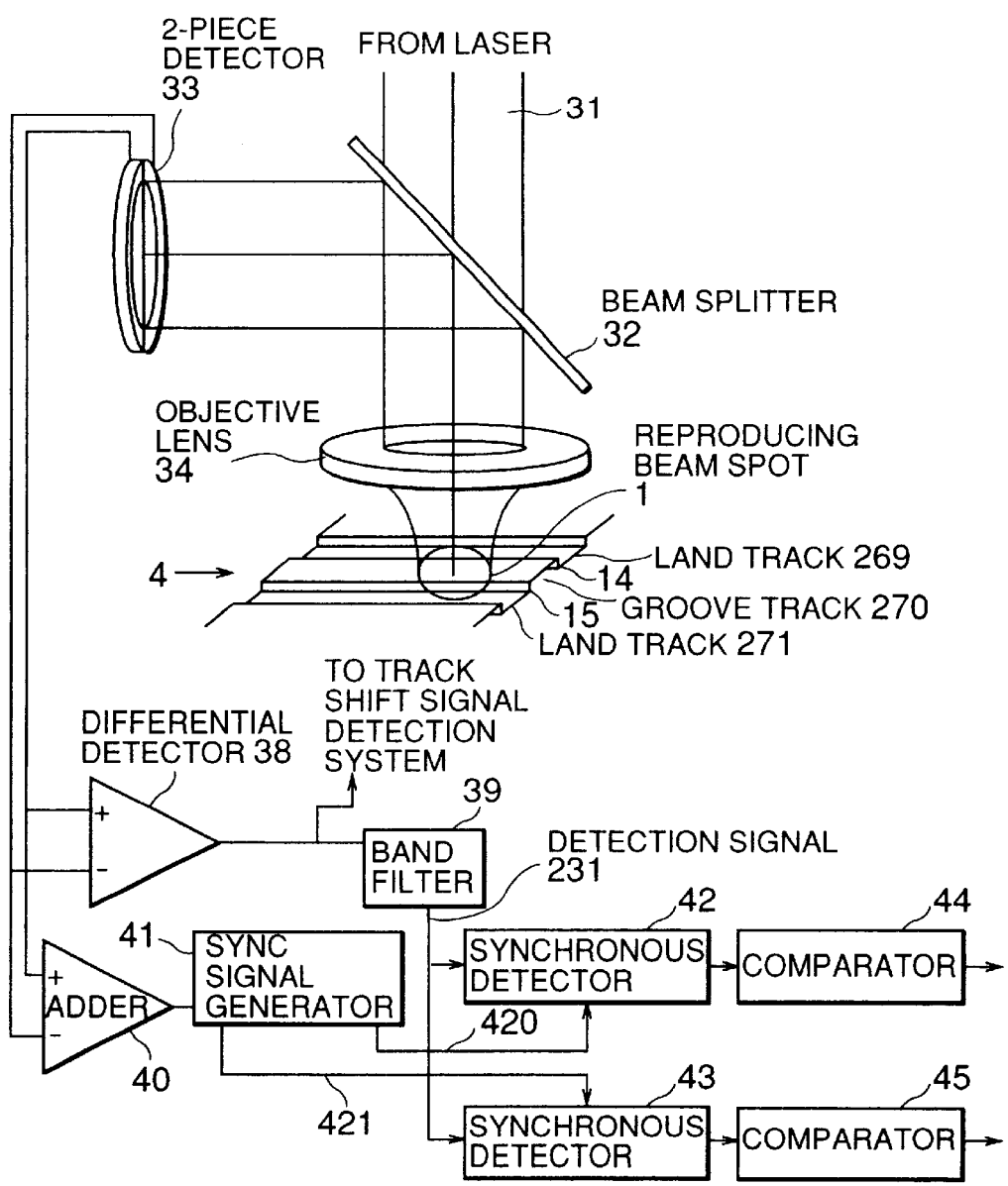
FIG. 5A is an explanatory diagram showing a part of the structure of the recording and reproducing apparatus for recording or reproducing information on the optical disk according to the first embodiment of the present invention.

Referring to FIG. 4, description will be made of the principle of the method of detecting address information 13 represented by the wobbling waveform from the optical disk according to the first embodiment of the present invention. To make it easy to understand the principle of the method of detecting address information according to the present invention, description will be made with reference to the waveforms in FIG. 4 which schematically represents signal waveforms. As shown in FIG. 5A, the reproducing beam spot is moved along a track, specifically, the land track 271, for example, and a reflected luminous flux is detected by a two-piece detector 33, whose light receiving face is split in half. As a result, a detection signal of the two-piece detector 33, in other words, an output difference signal obtained from the left and right light receiving faces of the detector 33 is a composite waveform resulting from algebraically adding together a signal 415 or 416 representing the wobbling waveform of the border 15 on the inner circumference side of the land track 271 and a signal 417 or 418 representing the wobbling waveform of the border 14 on the outer circumference side of the track 271. The signals 415 and 416 respectively correspond to the waveforms representing "0" and "1" on the border 15 on the inner circumference side. Therefore, the signals 415 and 416 are 180 degrees out of phase with each other. Similarly, signals 417 and 418 correspond to the waveforms representing "0" and "1" of the border 14 on the outer circumference side, so that the signals 417 and 418 are 180 degrees out of phase with each other. Because the wobbling waveform of the border 15 on the inner circumference side is 90 degrees out of phase with the wobbling waveform of the border 14 on the outer circumference side, in other words, because the two waveforms are formed so as to be orthogonal to each other, the signals 417, 418 are orthogonal to the signals 415, 416.

According to the present invention, synchronous detection is performed by generating a reference signal 420 for use in detecting signals 415, 416 of wobbling waveforms on the border on the inner circumference side of the track, and a reference signal 421 for use in detecting signals 417, 418 of wobbling waveforms on the border on the outer circumference side of the track. The reference signals 420, 421 are orthogonal to each other. By using a fact that the signals 417, 418 on the outer circumference side are orthogonal to the signals 415, 416 of wobbling waveforms on the border on inner circumference side, the signals 415, 416 of wobbling waveforms on the border on the inner circumference side and the signals 417, 418 of wobbling waveforms on the border on the outer circumference side are separated and detected from a detection signal in the form of a composite waveform. The reference signals 420, 421 are generated by a method, which will be described later, using signals from the sync area 12 on the optical disk 4.

To begin with, a detection signal and two reference signals 420, 421 are multiplied respectively and integrated with respect to time. The detection signal is multiplied by the reference signal 420 for the inner circumference side, and integrated with respect to time. For the sake of clarity, the signals 415, 416 from the inner circumference side and the signals 417, 418 from the outer circumference side are respectively multiplied by the reference signal 420, and integrated with respect to time. When the reference signal 420 is multiplied by the signals 417, 418 on the outer circumference side, since they are orthogonal to each other, the multiplication results are as indicated by the signals 424, 425, and they are reduced to zero by time integration. More specifically, the signals of the wobbling waveform on the outer circumference side of the track are reduced to zero by this process and disappear. On the other hand, when this reference signal is multiplied by signals 415, 416 on the inner circumference side, since they are synchronized, the multiplication results are as indicated by signals 422, 423. When those signals are integrated, bit "0" becomes a signal of negative level and bit "1" becomes a signal of positive level, so that the phases of the wobbling waveforms on the border 14 can be converted to amplitude levels. As described, the detection signal is subjected to synchronous detection using the reference signal 420, and only the address information 13 in the wobbling waveform on the border on inner circumference side can be obtained as amplitude levels.

Similarly, the detection signal and the reference signal 421 for the outer circumference side are multiplied together, and integrated with respect to time. When the reference signal 421 is multiplied by the signals 417, 418 on the borders on the outer circumference side, since these signals are orthogonal to each other, the multiplication results are as indicated by the signals 426, 427, and when they are integrated with respect to time, they are reduced to zero. In other words, the signals of the wobbling waveform on the inner circumference side of the track become zero and become negligible. On the other hand, when the reference signal 421 is multiplied by the wobbling waveforms 415, 416, since these signals are synchronized, the multiplication results become signals 428, 429, and when integrated, bit "0" becomes a signal of negative level, and bit "1" becomes a signal of positive level, the phases of the wobbling waveforms on the border can be converted into amplitude levels. As has been described, when the detection signal is subjected to synchronous detection by the reference signal 421, only the address information 13 in the wobbling waveform on the outer circumference side can be detected as amplitude levels.

By those processes, address information 13 recorded on the borders on the inner circumference side and outer circumference side of the track can be separated and obtained. By comparing the respective items of address information, it can be accurately known whether the reproducing beam spot is located on the groove track 270 or 272, or on the land track 271, or on which track, 270, 272, or 271, the beam spot is located.

The configuration of the whole recording and reproducing apparatus for reading address information according to the above-mentioned principle will now be described with reference to FIGS. 5A, 5B, 28, and 29.

Figure 28:
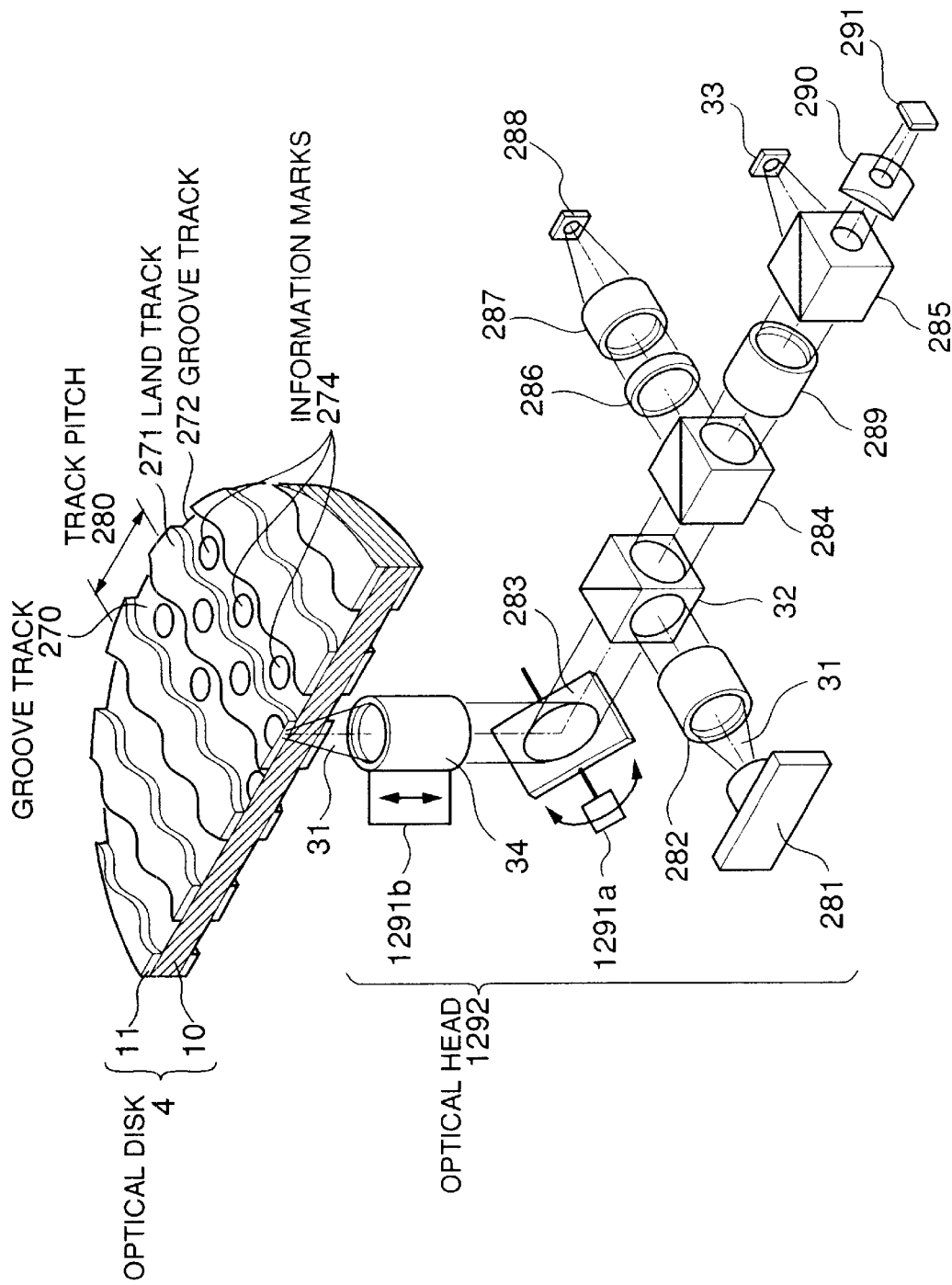
FIG. 28 is an explanatory diagram showing the structure of the optical system of the optical head 1292 of the optical disk recording and reproducing apparatus according to the first embodiment of the present invention.
Figure 29:
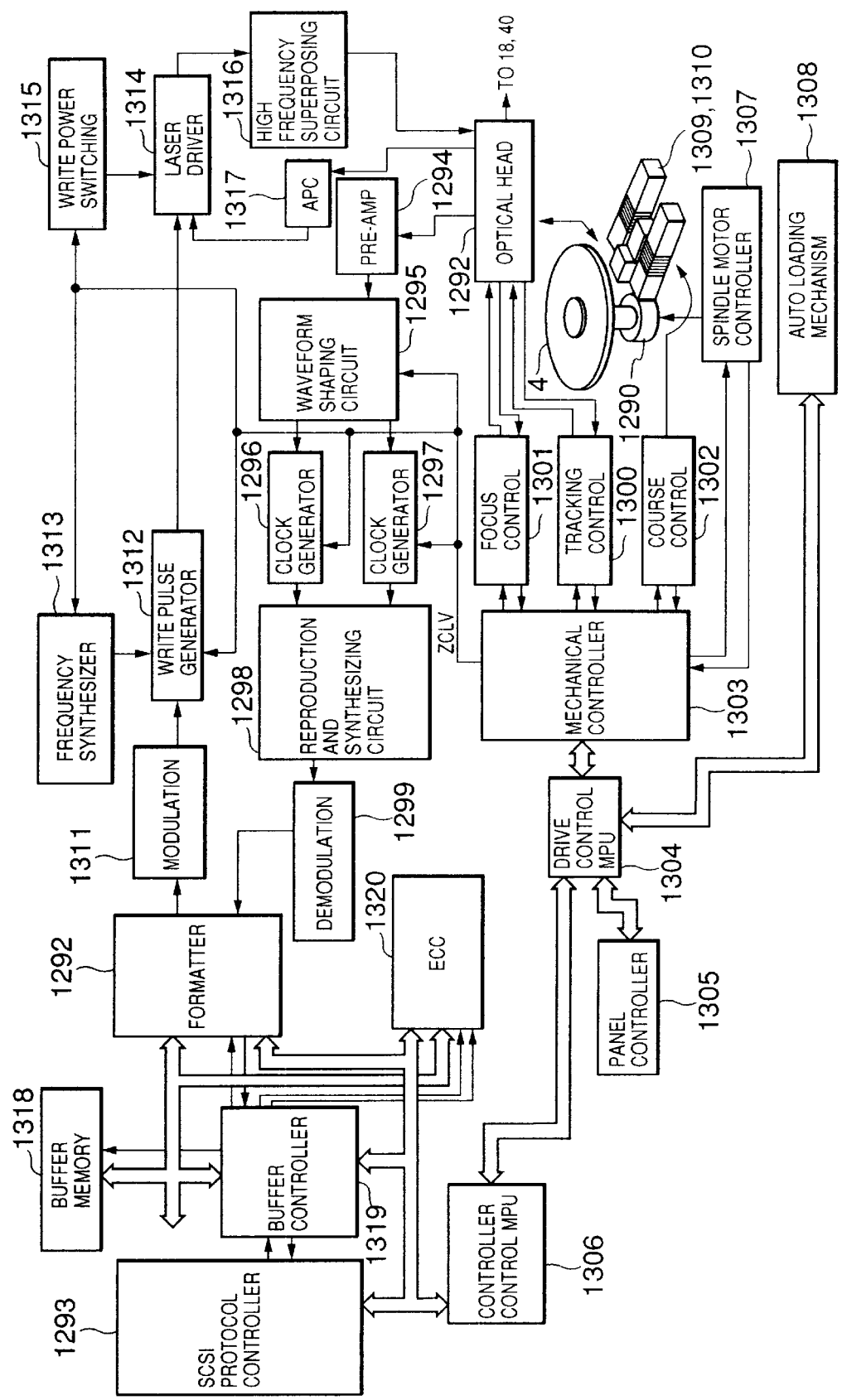
FIG. 29 is a block diagram showing the structure of the whole optical disk recording and reproducing apparatus according to the first embodiment of the present invention.

The recording and reproducing apparatus according to the first embodiment includes an optical disk 4, an optical head 1292, an electric circuit system, and a drive system as shown in FIG. 29. The optical head 1292 incorporates an optical system for recording and reproducing data from the optical disk 4 (FIG. 28). The drive system includes a spindle motor 1290 for rotating the optical head 1292, a tracking actuator 1291a for driving the laser beam 31 in the width direction of the track, and a focus actuator 1291b for driving the laser beam 31 in the optical axis direction. The electric circuit system includes a signal processing system for supplying a signal to be recorded on the optical disk 4 to the optical head 1292, and processing a signal read out from the optical disk 4, and a control system for controlling the drive system.

The optical disk 4 according to the first embodiment is 120 mm in diameter, and has two, front and rear substrates glued together. A recording film 11 is placed between the two substrates. The substrate 10 on the side on which a light beam from the optical head 1292 is irradiated is made of plastic 0.6 mm in thickness. Information is recorded and reproduced by condensing and passing the laser beam 31 through the substrate 10. On the surface of the recording film 11 on the substrate 10, there are provided groove tracks such as 270, 274, and land tracks such as 271 formed between the groove tracks such as 270, 272 as mentioned above. A track pitch 280 is defined as the space between the groove tracks, such as 270, and is 1.2 $\mu$m in this first embodiment. The recording film 11 is a film chiefly composed of Ge and is about 300 Angstrom in thickness, and formed on the substrate 10 by vapor deposition. The information mark 274 is an area having a different reflectance factor from that of the surrounding area and formed by irradiating a laser beam 31 from the optical head 1292 onto the recording film 11 through the substrate 10, to thereby cause a thermal change on the recording film 11.

The optical head 1292, as shown in FIG. 28, includes a semiconductor laser 281 for emitting a laser beam 31, and a collimator lens 282, a galvano mirror 283, and objective lens arranged in succession along the optical path of the laser beam 31 emitted from the semiconductor laser 281. Arranged between the collimator lens 282 and the galvano mirror 283 is a beam splitter 32 for separating the beam (of the laser beam 31) reflected by the optical disk 4 from the laser beam 31. The reflected beam separated by the beam splitter 32 is divided by another beam splitter 284 into two luminous fluxes. An analyzer 286, a collective lens 287, and a photodetector 288 are arranged on the optical path of one luminous flux, and those elements constitute an information mark detecting optical system for detecting the information marks 274. The other luminous flux, after being condensed by the collective lens 289, is further separated by another beam splitter 285 into two luminous fluxes, and on the optical path of one luminous flux, there are arranged a cylindrical lens 290 and a four-piece divided detector 291, which constitute a focus error signal detecting optical system for detecting a focus error signal representing an extent of shift of the optical disk 4 from the focus of the objective lens 34. On the optical path of the other luminous flux separated by the beam splitter 285, the two-piece photodetector 33 is arranged. The detection signal of the two-piece photodetector 33 is used for detection of address information 13 represented by the wobbling of the borders, such as 14, of the tracks, such as 270, and also for detection of a track shift signal.

The output power of the semiconductor laser 281 is about 35 to 40 mW when recording the information marks 274 on the optical disk 4, or about 3 to 5 mW when reproducing the information marks 274 and the address information 13 from the optical disk 4.

Description will now be made of the operation of each element when reproducing information from the optical disk 4. The laser beam 31 emitted from the semiconductor laser 271 is collimated by the collimator lens 282, and then deflected by the beam splitter 32, and further deflected by the galvano mirror 283, and condensed by the objective lens 34 to form a reproducing beam spot 1 on the optical disk 4 as shown in FIGS. 5A and 28. FIG. 5A shows the shape of the recording film 11 when the optical disk is seen from the side of the substrate 10, and therefore in FIG. 5A, the shapes of the grooves and lands of the tracks, such as 270, are inverted.

The reflected beam of the laser beam 31 from the optical disk 4 again passes through the objective lens 34, is reflected by the galvano mirror 283, passes through the beam splitter 32, and is separated by the beam splitter 284 into two fluxes. One luminous flux is condensed as it passes through the analyzer 286 and the collective lens 287, and detected by the photodetector 288. Output of the photodetector 288 is processed by an electric circuit to be described later, so that signals from the information marks 274 are detected. The other luminous flux separated by the beam splitter 284, after being condensed by the collective lens 289, is separated by a beam splitter 285, and one luminous flux is condensed by the cylindrical lens 290, and detected by the four-piece photodetector 33. Output of the photodetector 33 is processed by a well-known astigmatism process to obtain a focus error signal.

Figure 21:
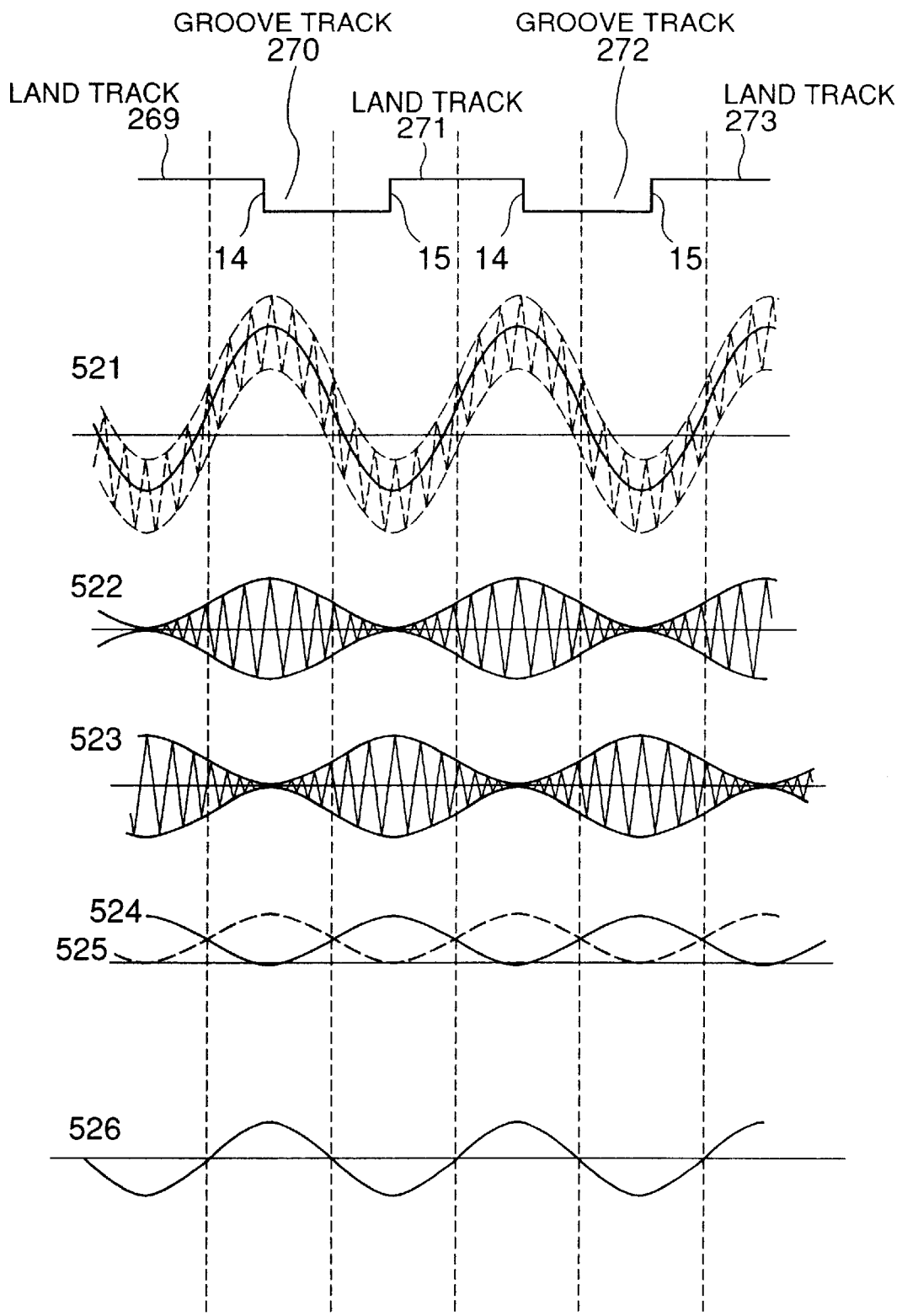
FIG. 21 is an explanatory diagram showing waveforms of signals detected by the circuit in FIG. 20.

The other luminous flux separated by the beam splitter 285 is detected by the left and right light receiving faces of the two-piece photodetector 33. The parting plane of the photodetector 33 is parallel with the longitudinal direction of the groove track 270. The signals of the left and right receiving faces of the two-piece photodetector are input into a differential detector 38 and an adder 40. Output of the differential detector 38, like a signal 521 in FIG. 21, is in a shape formed by superimposition of signals from wobbling of the borders 14, 15 of the tracks 270, etc. on the track shift signal. Therefore, a band filter 39 is used to pass only the oscillation frequency of the signals from wobbling of the borders 14, 15 of the tracks 270, etc. for input into synchronous detectors 42, 43. On the other hand, output of the adder 40 is input to a synchronous signal generator 41 to generate reference signals 420, 421 in FIG. 4.

Figure 5B:
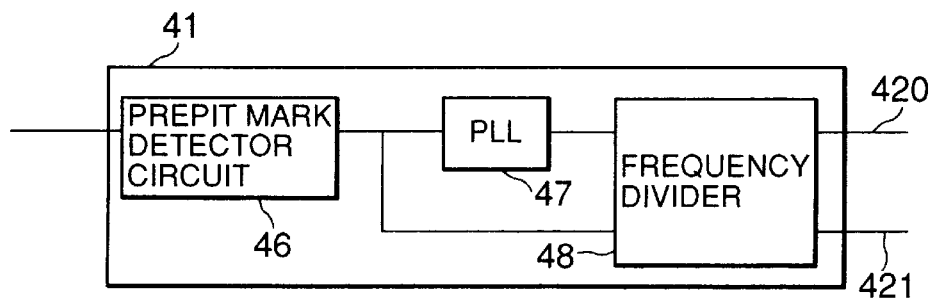
FIG. 5B is a block diagram showing a detailed structure of a circuit 41 in FIG. 5A.

More specifically, the synchronous signal generator 41 generates reference signals 421, 422 using the circuit in FIG. 5B according to a signal from the sync area 12 of the optical disk 4. For example, if the sync area 12 has prepit marks of a mark string of 51, 52 in FIG. 7A, a prepit mark detecting circuit 46, shown in FIG. 5B, of the synchronous signal generator 41 detects a signal corresponding to the mark string of 51, 52 from output of the adder 40. This sync areas 12, as described before, are provided at fixed intervals on the tracks, such as 270, so that by using this signal to start the phased locked loop (PLL) 47, clock pulses with a frequency of a specified multiple of the repeating frequency of this signal are generated. The sync area 12 is synchronous with the wobbling frequency of the borders 14, 15 of the tracks 270, etc. Therefore, by starting frequency division by a frequency divider 48 in step with clock pulses generated by a PLL 47, the frequency divider 48 generates reference signals 420, 421 which are equal both in wobbling frequency and phase of the wobbling to the borders 14, 15 of the tracks 270, etc.

Figure 23:
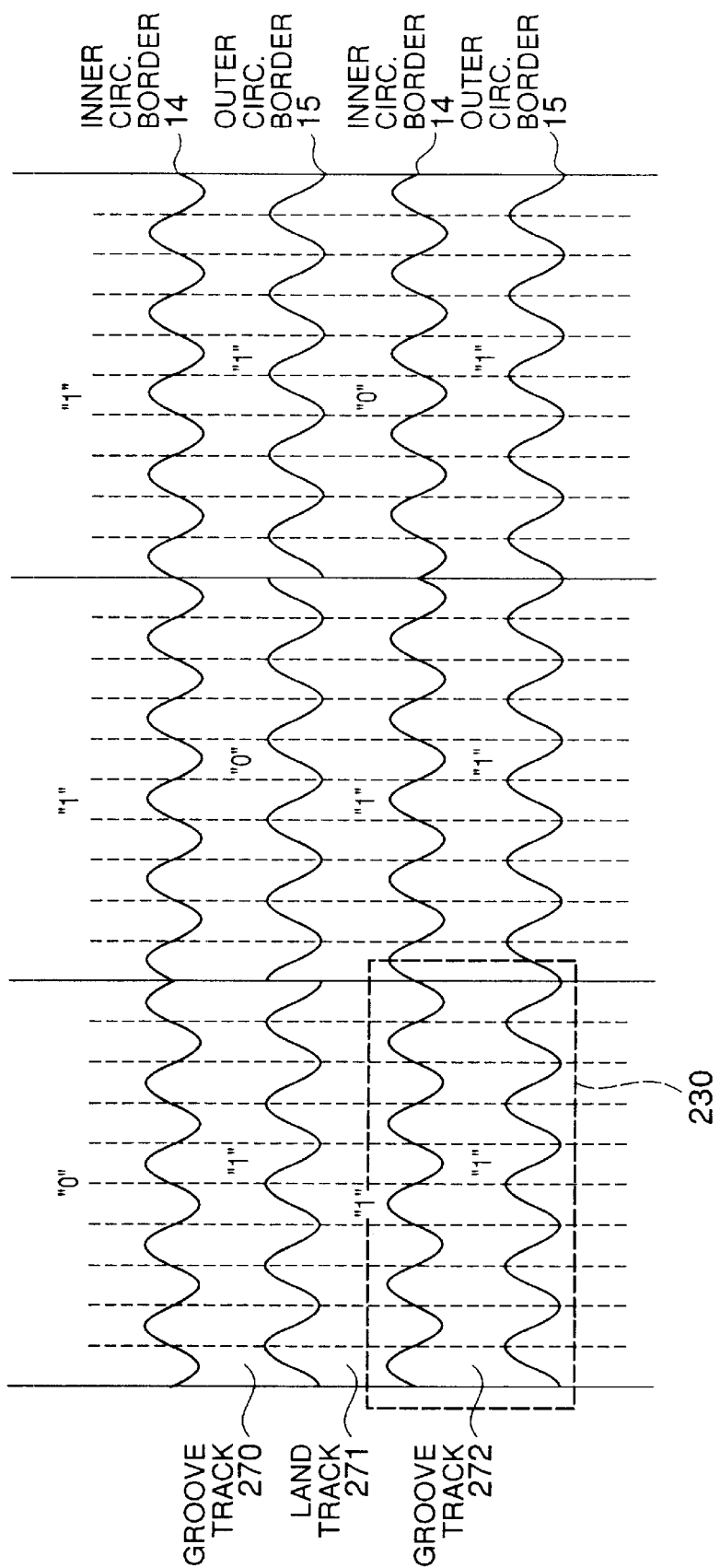
FIG. 23 is an explanatory diagram showing the area scanned by the beam spot when reading one bit on the track 272 of the optical disk in FIG. 3.
Figure 24:
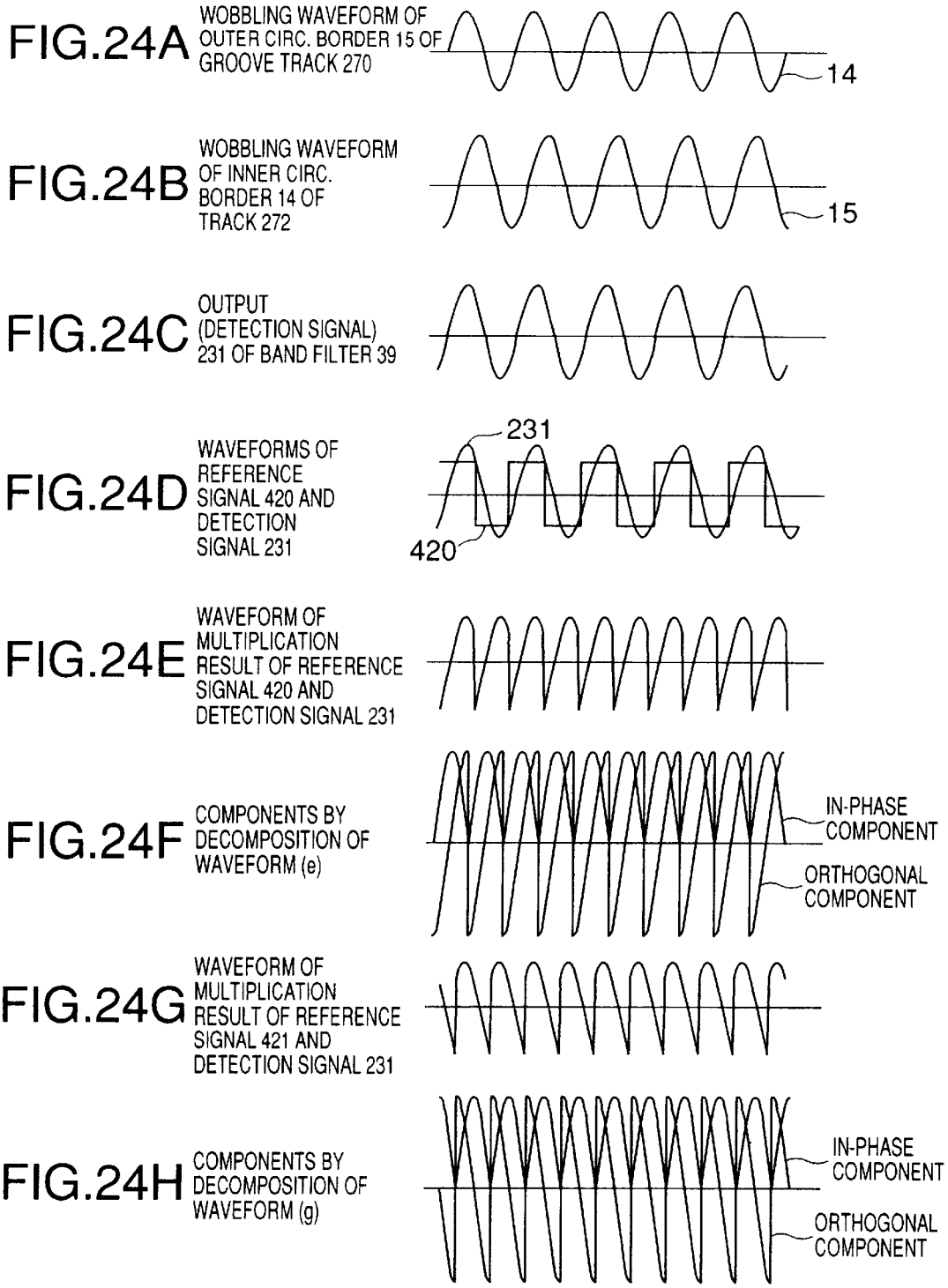
FIGS. 24A to 24H are explanatory diagrams showing waveforms of signals when demodulating address information using the circuit of FIG. 5A.

For example, in the optical disk 4 on which the borders 14, 15 of the groove tracks 272, etc. wobble in the wobbling waveforms shown in FIG. 23, the output signal (hereafter referred to as a detection signal 231) of the band filter 39 when the reproducing beam spot 1 is scanning the area 230 enclosed by a dotted line along the groove track 272 is shown in FIG. 24C. The detection signal 231 output from the band filter 39 has a waveform (FIG. 24C) which is an algebraically added waveform of the wobbling waveform (FIG. 24A) of the inner circumference border 14 of the groove track 272 and the wobbling waveform (FIG. 24B) of the outer circumference border 15 of the groove track 272. When this detection signal 231 is multiplied by a reference signal 420 from the synchronous signal generator 41 by means of the synchronous detector 42 (FIG. 24D), a waveform shown in FIG. 24E can be obtained. The waveform in FIG. 24E can be divided into an in-phase component (corresponding to the inner circumference side wobbling waveform of the groove 2) of the reference signal 420 and a component orthogonal to the reference signal 420 (this component corresponds to the wobbling waveform of the border 15 on the outer circumference side of this groove track 272) (FIG. 24F). Therefore, when the waveform of FIG. 24E is integrated by the synchronous detector 42, the orthogonal component is reduced to zero, with the result that only the in-phase component appears, and in the case of FIG. 24F, the output level is on the positive side, and it is found that the signal is bit "1". Therefore, by comparing the level of output of the synchronous detector 42 with a predetermined level using a comparator 44 and deciding whether the output level is positive or negative, it is possible to detect whether wobbling data of the inner circumference side border 14 of the groove track 272 is "0" or "1", and thus demodulate the address information 13.

Similarly, if synchronous detection is performed on the detection signal 231 with the synchronous detector 43 by using a reference signal 421 which is 90 degrees out of phase with a reference signal 420, a resulting waveform is as shown in FIG. 24G, and if this waveform is analyzed, a waveform as shown in FIG. 24H is obtained. If this waveform is integrated by the synchronous detector 43, the orthogonal component is reduced to zero, and only the in-phase component appears. In the case of the waveform of FIG. 24H, the output level is positive, and a signal of bit "1" is detected. Therefore, by deciding whether the output level is positive or negative by comparing the output level of the synchronous detector 43 with a preset level by the comparator 45, it is possible to detect whether the wobbling data of the outer circumference side border 15 of the groove track 272 is "0" or "1", and thus demodulate the address information 13. The demodulated address information is sent to the formatter 1292 (FIG. 29) of the electric circuit system of the recording and reproducing apparatus, and is also sent through an SCSI interface 1293 to a CPU (not shown) connected with the recording and reproducing apparatus.

Output of the photodetector 288 is amplified by a preamplifier 1294 in FIG. 29, and after passing through a waveform shaping circuit 1295, is input to reproduction clock generators 1296, 1297 to generate a reproduction clock signal. Data discrimination is performed by a reproduction and synthesizing circuit 1298 using the reproduction clock and output of the waveform generator circuit 1295, and data consisting of the information marks 274 is demodulated by a demodulator circuit 1299. The demodulated data of information marks 274 is sent to the formatter 1292 (FIG. 29) of the electric circuit system of the recording and reproducing apparatus, and is also sent through the SCSI interface 1293 to a CPU (not shown) connected with the recording and reproducing apparatus.

When information is recorded on the optical disk 4, the formatter 1292 receives data to record through the SCSI interface from the host unit, data is converted by the modulator circuit 1311 into a modulated signal, and input into a write pulse generator circuit 1312. The write pulse generator circuit 1312 generates recording pulses corresponding to the position to record data on the track of the optical disk 4 in accordance with a recording clock generated by a frequency synthesizer 1313, and sends the pulses to a laser driver 1314. A write power switching circuit 1315 sets laser power for recording at the laser driver 1314. The laser driver 1314 generates a pulse waveform to drive the semiconductor laser 281 from the set laser power and recording pulses. A high frequency superimposing circuit 1316 outputs a waveform, formed by superimposing a high frequency on the pulse waveform, to the semiconductor laser 281 to drive the laser 281. Output of the semiconductor laser 281 is monitored by an auto power controller 1317, and fed back to the laser driver 1314. Thus, a laser beam 31 of high energy is irradiated to a desired track, so that the recording film 11 is heated and information marks 274 are formed.

Description will now be made of control of the drive system while data is being reproduced or recorded on the optical disk 4.

Output of the differential detector 38 is input to a circuit (not shown) to detect a track shift signal of the spot of the laser beam 31 by a well-known method, such as the push-pull method, and thereby detect a track shift signal. Output of the four-piece detector 291 is input to a circuit (not shown) to detect a focus error signal of the spof of the laser beam 31 by a method, such as the astigmatism method, and thereby detect a focus error signal.

A track shift signal is input to a tracking control circuit 1300, and a control signal to drive a tracking actuator 1291a is generated. According to this signal, the tracking actuator 1291a moves the galvano mirror 283 to position the sopt of the laser beam 31 along a desired track, such as 270. The focus error signal is input to the focus control circuit 1301 to generate a control signal to drive the focus actuator 1291b. In response to this control signal, the focus actuator 1291b drives the objective lens 34 in the optical axis direction, and thereby performs focus servo to maintain focus of the objective lens 34 on the surface of the optical disk 4.

Access of the spot of the laser beam 31 onto the optical disk 4 is performed by a fine actuator 1309 for a minute range, but when the beam spot is moved over a long range, the course actuator 1310 is used to move the whole optical head. During tracking, the fine actuator 1309 and the course actuator 1310 move in an interlocked motion with each other. Therefore, even if the center of the optical disk 4 deviates from the center of the spindle motor 1290 which rotates the optical disk 4, the spot of the laser beam 31 can be made to stably follow the tracks 270, etc.

When giving the spot of the laser beam 31 long-range access to a desired track, the optical head 1292 is moved by the course actuator 1310 over a long distance to the vicinity of the track. Then, the beam spot is moved by an interlocked motion of the fine actuator 1309 and the course actuator 1310 so that the beam spot is positioned at the target track. The series of motions are performed by the actuators 1309, 1310 under control of a mechanical controller 1303 by exchange of information among the mechanical controller 1303, the tracking control circuit 1300, and the course control circuit 1302. The spindle motor 1290 is driven by the spindle motor control circuit 1307 so that the optical disk 4 rotates stably at a specified number of revolutions.

The whole drive system is controlled by a drive control MPU 1304, and signals are exchanged among an auto loading mechanism 1308, the mechanical controller 1303, and a controller control MPU 1306 etc. The optical disk 4 is attached and detached to and from the spindle by the auto loading mechanism 1308 under control of the drive control MPU 1304. Further, the beam spot is positioned for recording and reproduction by controlling the mechanical controller 1303, signals are processed for recording and reproduction by controlling the controller control MPU 1306, and maintenance information is obtained by controlling the panel control unit.

Meanwhile, arranged between the formatter 1292 and the SCSI interface 1293 are a buffer memory 1318 and a buffer controller 1319. The buffer memory 1318 temporarily stores reproduced data bound for the host unit, and record data to be recorded that is received from the host unit, and the buffer controller 1319 controls the buffer memory 1318. The controller control MPU 1306, etc. are connected with an ECC circuit 1320 for correction of error data.

In the first embodiment, a reproduction clock signal are generated from a signal of the sync area 12, while on the other hand, for the recording clock signal, a clock signal of fixed frequency output from the frequency synthesizer 1313 is used, but needless to say, a clock signal generated from a signal of the sync area 12 can be used for recording. A variation occurs in the relative linear velocity of the beam spot on the track during recording due to a variation in the number of revolutions of the optical disk 4 or the eccentricity of the center of the optical disk 4 with respect to the rotating center of the spindle motor. When this variation occurs, a recording clock signal generated from a signal of the sync area 12 also varies with this variation, so that by using the recording clock signal, information marks 274 can be recorded at a fixed frequency on the track.

Description will be made of the optical disk producing method according to a second embodiment of the present invention for the optical disk 4 according to the first embodiment.

Figure 10:
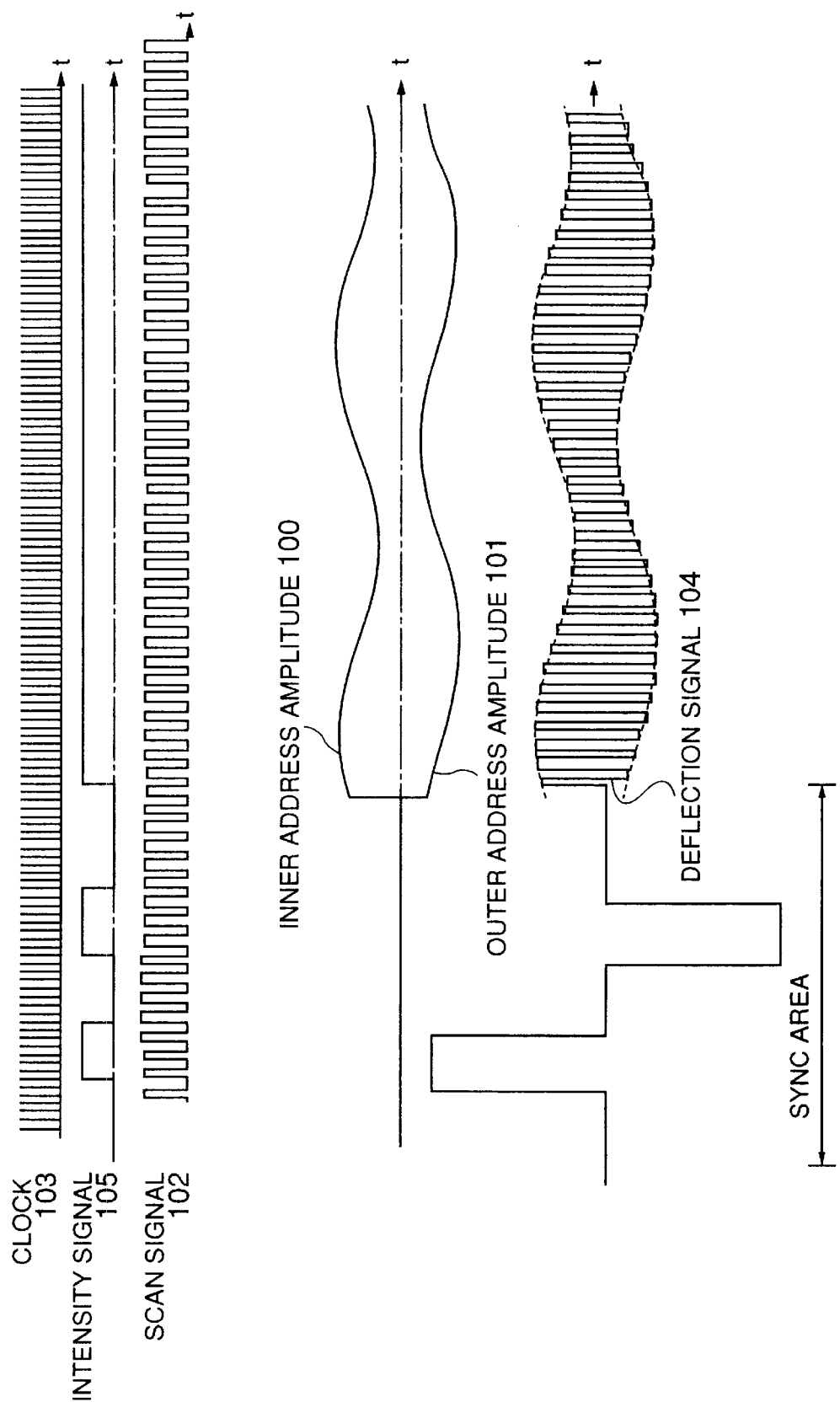
FIG. 10 is an explanatory diagram showing waveforms of signals used in the circuits related to FIGS. 3 and 9.
Figure 22:
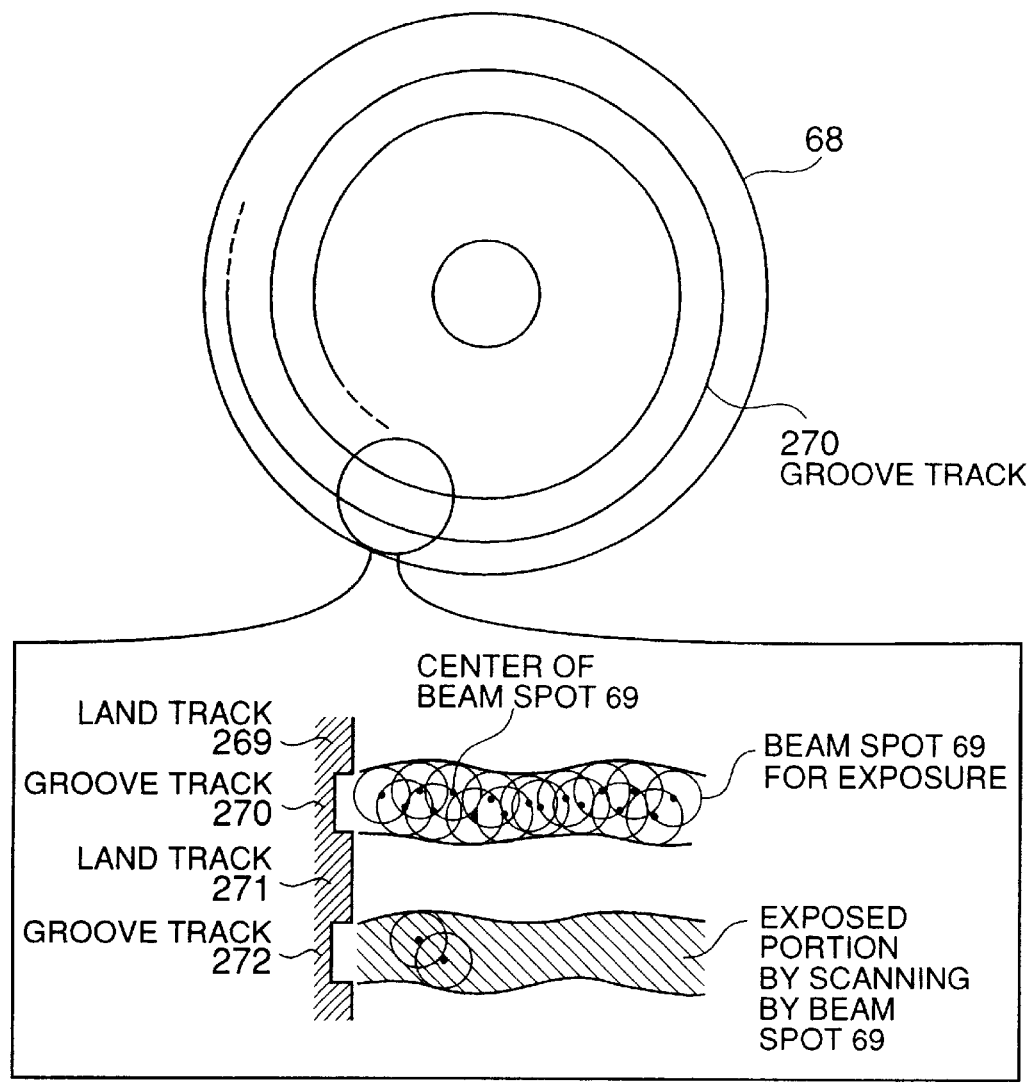
FIG. 22 is an explanatory diagram for explaining a relationship between the beam spot and the track shape on the original disk exposed by the exposure system in FIG. 9A, and showing on an enlarged scale the grooves formed on the information recording medium (disk) in the present invention.

To begin with, the shape of the shape of the tracks, such as 270, on the optical disk 4, and the shape of the mark string of 51, 52 etc. of the sync area 12 are precisely formed on the surface of a glass substrate in a disk form as shown in FIG. 22, and from this glass substrate, an original disk 68 is formed. The original disk 68 has a photoresist film 68*a* deposited on a flat glass substrate 68*b* (FIG. 6), and patterns of tracks 270, etc. are transferred to the photoresist film 68*a* by exposure to light, and the original disk 68 are formed by developing the photoresist film. The shape of the surface of this original disk 68 is transferred to a metal such as nickel to form a metal stamper. When a plastic substrate 10 is molded by a method such as injection molding using this stamper, a plastic substrate 10 having tracks 270, etc. and mark strings, such as 51, 52 of the sync area 12 formed on the surface can be produced (FIG. 10). Subsequently, by forming a recording film 11 on the plastic substrate 10 by vapor deposition, for example, and attaching another substrate to the substrate 10, an optical disk 4 is completed.

At this time, since the optical disk 4 according to the first embodiment has a structure which represents address information 13 by wobbling the borders 14, 15 of the tracks 270, etc., it is necessary to precisely form the shapes of the tracks 270, etc. having wobbling waveforms (of the borders 14, 15) of desired phase on the surface of the original disk 68. Therefore, in this embodiment, by scanning the beam spot 69 while wobbling in the radial direction of the disk on the disk-shape glass substrate 68*b* covered on its surface with the photoresist film 68*a*, the hatched area in FIG. 22 is exposed to light. The area exposed to light is removed by a developing process and thereby groove tracks 270, 272, etc. are formed. The portion between the adjacent groove tracks 270, 271 remains after the exposure, and becomes a land track 271. Thus, an original disk 68 is formed as shown in FIG. 22.

Figure 6:
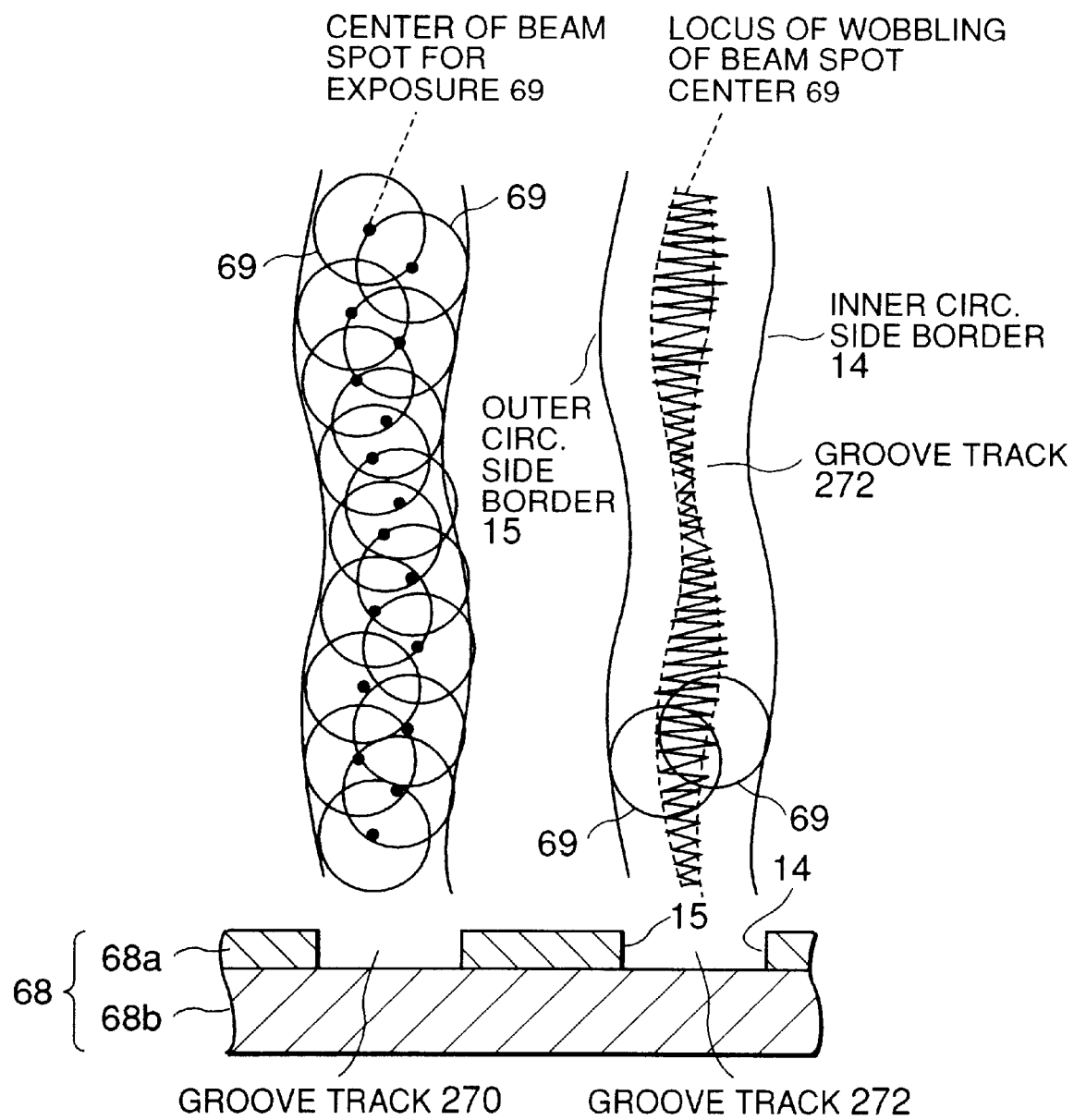
FIG. 6 is an explanatory diagram showing the movement of the beam spot on an original disk of an optical disk according to a second embodiment of the present invention when exposing the original disk to light.
Figure 8:
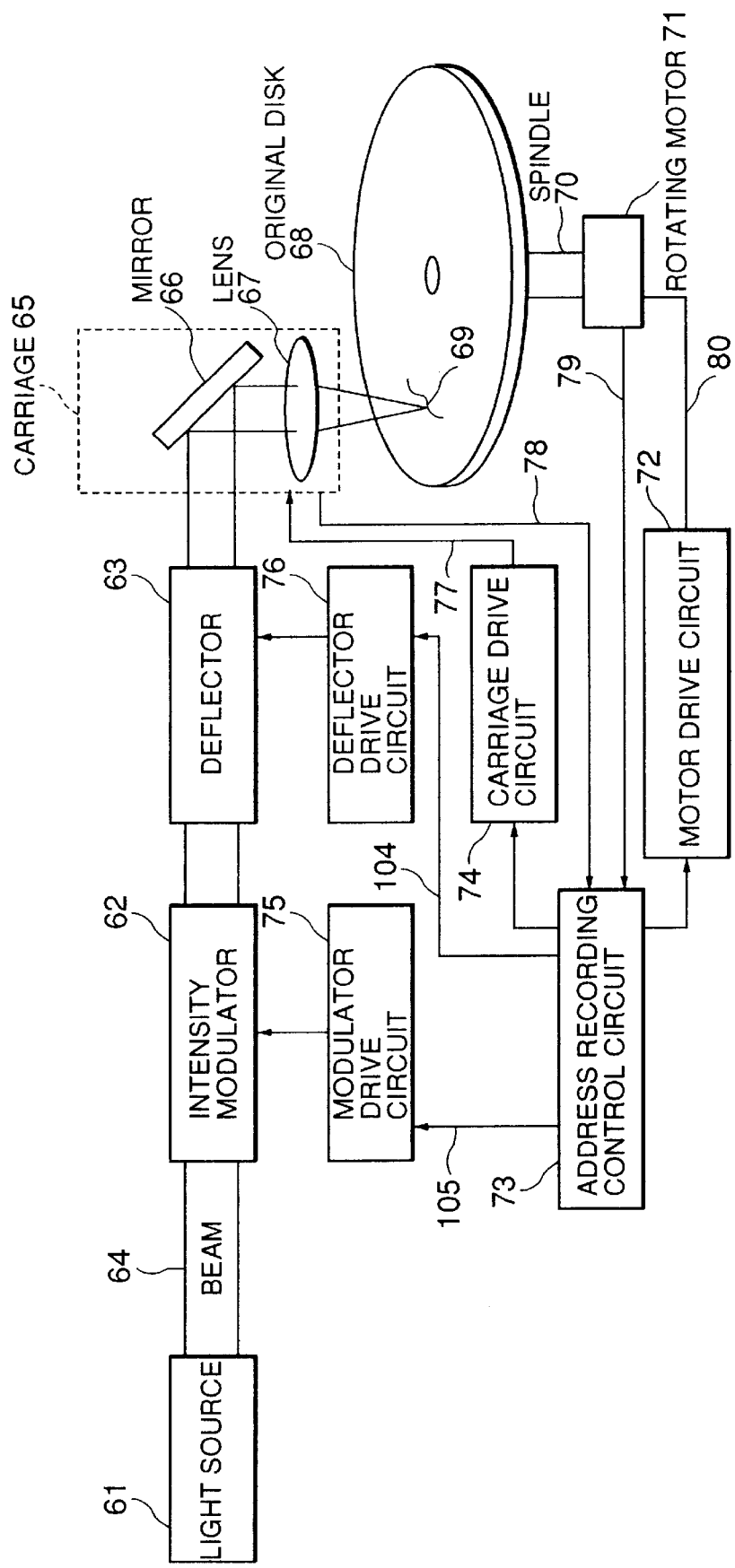
FIG. 8 is a block diagram of a light exposure system for producing an original disk for the optical disk according to the second embodiment of the present invention.

The method of light exposure of the original disk 68 and the light exposure system used will be described with reference to FIGS. 6 and 8. FIG. 8 shows a light exposure system to be used for exposure of the original disk 68 to light. FIG. 6 shows scanning of the beam spot 69 used when the groove tracks 270, etc, are formed on the original disk 68. Here, an explanation will be given for the case where the sync area 12 recorded on mark strings 51, 52 etc. in FIG. 7A.

In FIG. 8, the beam 64 from the light source 61, after having its intensity adjusted by the intensity modulator 62, passes through a beam deflector 63, is reflected by a mirror 66 to the original disk 68, and is condensed by the objective lens 67 to the original disk 68. Thus, a minute beam spot 69 is irradiated to the glass substrate 68*b* covered on its surface with a photoresist film 68*a*. The beam deflector 63, driven by a deflector drive circuit 76, minutely oscillates the optical axis of the beam 64. Therefore, the beam spot 69 on the original disk 68 minutely oscillates in the radial direction of the original disk 68. The amplitude of the oscillation is the width of the groove tracks 270, etc. If this width of the oscillation is made to vary with the wobbling waveforms of the borders 14, 15 of the groove tracks 270, etc., light exposure can be performed in the shape of the groove track 270 whose borders 14,15 wobble. In this manner, while the beam spot 69 is made to oscillate, the rotating motor 71 joint to a spindle 70 is driven by a motor drive circuit 72 to rotate the original disk 68. At the same time, a carriage 65 on which a bending mirror 66 and an objective lens 67 are mounted is moved gradually in the radial direction of the original disk 68 by a carriage drive circuit 74. The amount of movement of the carriage 65 is set as the amount of track pitch 280 (FIG. 28) by which the center of the beam spot 69 is shifted each time the original disk 68 makes a turn. By those motions, the tracks 270, etc. are formed in a spiral form at intervals of the track pitch 280, and the borders 14, 15 of the groove tracks 270, etc. can be made to wobble with specified phases. The carriage drive circuit 74 and the motor drive circuit 72 are controlled with feedback by the address recording control circuit 73. The address recording control circuit 73 sends a deflection signal 104 to the deflector drive circuit 76. The address recording control circuit 73 sends an intensity modulation signal to a modulator drive circuit 75.

The structure of the address recording control circuit 73 will be described in detail with reference to FIGS. 9A, 9B.

Figure 9A:
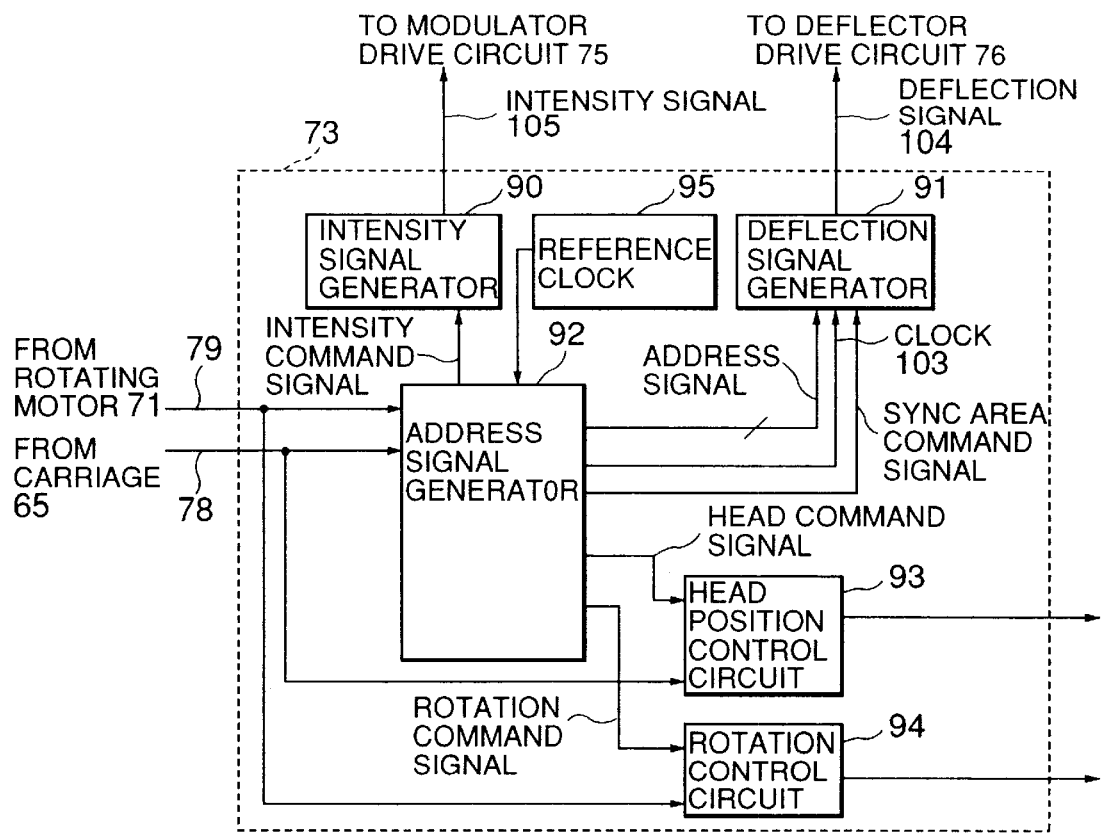
FIG. 9A is a block diagram showing a detailed structure of the address recording control circuit 73 of the exposure system of FIG. 8.
Figure 9B:
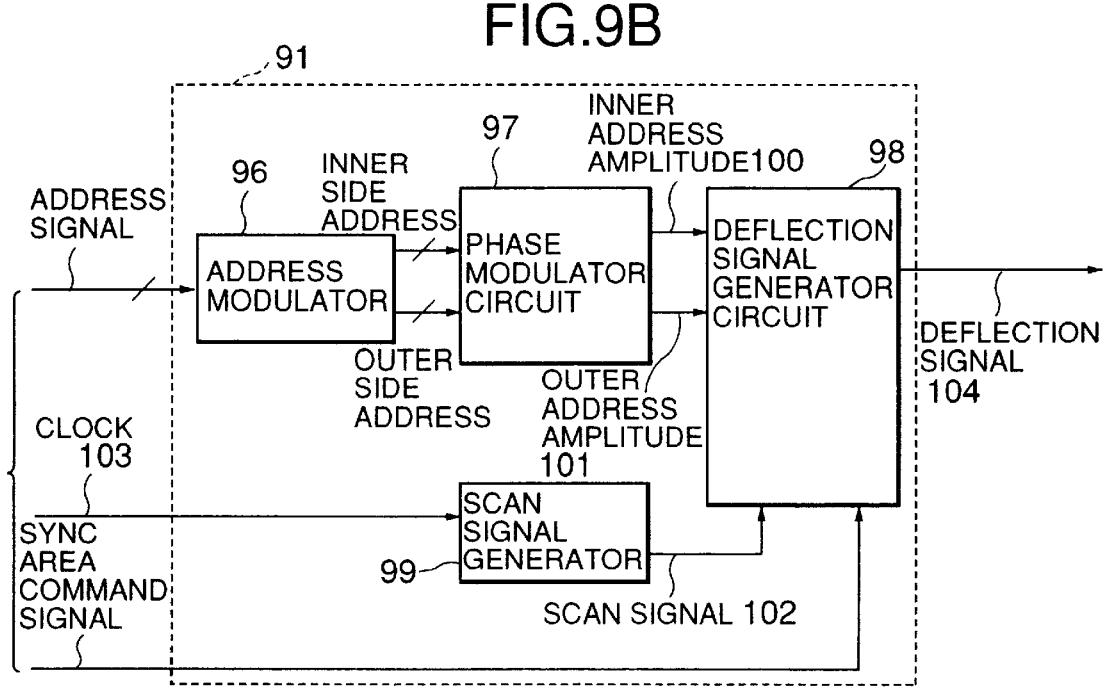
FIG. 9B is a block diagram showing a detailed structure of the deflection signal generator 91 of FIG. 9A.

As shown in FIG. 9A, the address recording control circuit 73 includes an address signal generator 92, and a reference clock circuit 95 for outputting a reference clock signal. Moreover, the address recording control circuit 73 includes an intensity signal generator 90 for outputting an intensity signal 105 to the modulator drive circuit 75, and a deflection signal generator 91 for generating a deflection signal 104, a head position control circuit 93 for outputting a signal to specify a drive amount to the carriage drive circuit 74, and a rotation control circuit 94 or outputting a signal to specify a drive amount to the motor drive circuit 72.

The address signal generator 92 receives rotation information 79 showing the current number of revolutions from the rotating motor 71 together with movement information 78 showing the current position from the carriage 65, and generates a head command signal showing a drive amount of the carriage 65 to make groove tracks 270, etc. in a spiral form. The head position control circuit 93 compares a head command signal with the movement information 78, and outputs a signal to control the carriage 65 to the carriage drive circuit 74. The address signal generator 92 obtains a number of revolutions corresponding to the position of the track 270, for example, by using rotation information 79, and outputs this number as a rotation command signal to the rotation control circuit 94. The rotation control circuit 94 compares rotation information 79 with the rotation command signal, and controls the rotating motor so as to rotate at a specified number of revolutions corresponding to the position of the head.

The address signal generator 92 generates an address signal showing the address of the groove track 270, for example, on the basis of rotation information 78 and movement information 79, and outputs the address signal to the deflection signal generator 91. Furthermore, the address signal generator 92 generates a clock signal 103 (FIG. 10) by dividing the frequency of the reference clock from the reference clock circuit 95, and outputs the clock signal to the deflection signal generator 91. From those signals, the deflection signal generator 91 generates a deflection signal 104 (FIG. 10) using a circuit to be described later. In addition, the address signal generator 92 generates an intensity command signal. On the basis of the intensity command signal, the intensity signal generator 90 generates an intensity modulation signal 105 (FIG. 10) to modulate the intensity of the beam 64 to form marks 51, 52, etc. in the sync area 12. To have the marks 51, 52 of the sync area 12 formed such that they wobble to right and left from the center of the track, the address signal generator 92 generates and outputs a synchronous area command signal to the deflection signal generator 91.

The structure of the deflection signal generator 91 and the method of generating a deflection signal 104 will be described with reference to FIG. 9B. An address signal is input to an address modulator 96, generates an address of the inner circumference side border 14 of the groove track 270, e.g., a signal of "110", and an address of the outer circumference side border 15, e.g., a signal of "110". The two addresses are converted by the phase modulator circuit 97 into wobbling waveforms representing "1" and "0" according to a difference of the phase as shown in FIG. 3, thus forming an amplitude signal 100 corresponding to the address of the inner circumference side border 14 and an amplitude signal 101 (FIG. 10) corresponding to the address of the outer circumference side border 15. Those signals are input to the deflection signal generator 98. A clock signal 103 is input to a scan signal generator 99, which generates a scan signal 102 for scanning the beam spot 69 in the radial direction of the original disk 68, and outputs the scan signal to the deflection signal generator 98. The deflection signal generator 98 generates a deflection signal (FIG. 10) by modulating the amplitude of the scan signal 102 by using the amplitude signal 100 and the amplitude signal 101 so that the beam spot 69 scans between the inner circumference side border 14 and the outer circumference side border 15. The synchronous area command signal is input to the deflection signal generator 98. The deflection signal generator 98 generates a deflection signal 104 to cause the beam spot 69 to deflect in synchronism with the scan signal 102 in the sync area 12 so as to shift about ¼ of the track pitch 280 to the left and right of the groove track, such as 270.

By using a deflection signal 104 designed to work as mentioned above, by performing the light exposure process on the original disk 68 with the light exposure system in FIG. 8, the shape of the groove track 270, for example, showing address information in wobbling waveforms of the borders 14, 15 and the shape of the mark strings 51, 52 in the sync area 12 in FIG. 7A are exposed to light. Therefore, by perfroming the developing process on the original disk 68, the original disk 68 for the optical disk 4 according to the second embodiment can be produced.

In the above description, the exposure method was discussed referring to the case of the sync area 12 in FIG. 7A, but the other forms of sync area 12 shown in FIGS. 7B and 7C can also be formed by exposure. However, in the cases of FIGS. 7B and 7C, since the sync area 12 is formed by grooves, the deflection signal 104 is made so that the sync area 12 is exposed to light in a shape of a groove.

Description will next be made of the method and the circuit for reproducing address information according to a third embodiment of the present invention. This detection method reproduces address information 13 from the optical disk 4 without using the sync area 12.

In the optical disks having the sync area 12 as shown in FIGS. 7A, 7B and 7C, information marks 274 cannot be recorded in the sync area 12, and the sync area 12 occupies that portion of the track. If reference signals 420, 421 and a reproducing clock signal can be detected from the wobbling waveforms of the borders of the tracks 270, etc., there is no need to provide the sync area 12, and the data recording efficiency can be improved.

According to the third embodiment, in place of the sync area 12, a synchronous (SYNC) segment is provided which has the same phase as the wobbling waveforms of the inner circumference side border 14 and the outer circumference side border 15 of the track. The SYNC segment is like the sync area 12 of FIG. 7B, but as shown in FIG. 7B, the wobbling amplitude of the sync area 12 is made larger than the wobbling amplitude of the address information 13, and therefore information marks 274 cannot be recorded in the sync area 12, but the SYNC segment is set to have the same wobbling amplitude as in address information 13. Therefore, information marks 274 can be recorded in the SYNC segment in the same way as in other areas.

Referring to FIG. 11, description will start with the method of generating reference signals 420, 421 from an optical disk 4 according to the third embodiment without using the sync area 12. As described above, in address information 13, the wobbling waveforms of the borders 14, 15 of the tracks 270, etc. have the same frequency, but differ in phase. The phase differences take no more than four states: 0 degree, 90 degrees, 180 degrees, and 270 degrees, so that timing at zero crossing of the detection signal 231 (FIGS. 5 and 24) when the wobbling of a groove is detected corresponds to 4t (t is a natural number) times the frequency of the wobbling. Accordingly, the circuit structures of FIGS.

5A and 5B are changed into those in FIGS. 11A and 11B, and the timing at zero crossing of the detection signal 231 is detected by a zero cross detector 125, and in synchronism with the timing, a PLL (phase locked loop) 12 is started. By this arrangement, a signal having a frequency four times the wobbling frequency can be produced. What is more, if the relative linear velocity between the reproducing and recording beam spot 1 and the track 270 varies due to a minute variation in the rotating speed of the spindle motor 1290 (FIG. 29) or the eccentricity of the optical disk 4 with respect to the rotating center of the spindle motor 1290, the signal produced as mentioned above also varies with those variations. Therefore, this signal is synchronous with the recorded wobbling waveform, and by dividing the frequency of this signal by a frequency divider 127, a synchronous signal of a wobbling waveform with the same frequency as the recorded wobbling waveform can be obtained.

The synchronous signal of the frequency-divided wobbling waveforms has, a frequency synchronous with the wobbling waveforms, but it is not known whether the phase is synchronous with the wobbling waveforms. To generate reference signals 420, 421, it is necessary to provide a synchronous signal synchronous in phase with the wobbling waveforms, so that this phase needs to be decided. To this end, the frequency divider 127 is used to generate signals having four phases, 0 degree, 90 degrees, 180 degrees and 270 degrees on the basis of output of the PLL 126. Any one of those signals is in phase with the wobbling waveforms. The above-mentioned SYNC segment is used to select the synchronized phase out of the four phases.

Figure 12:
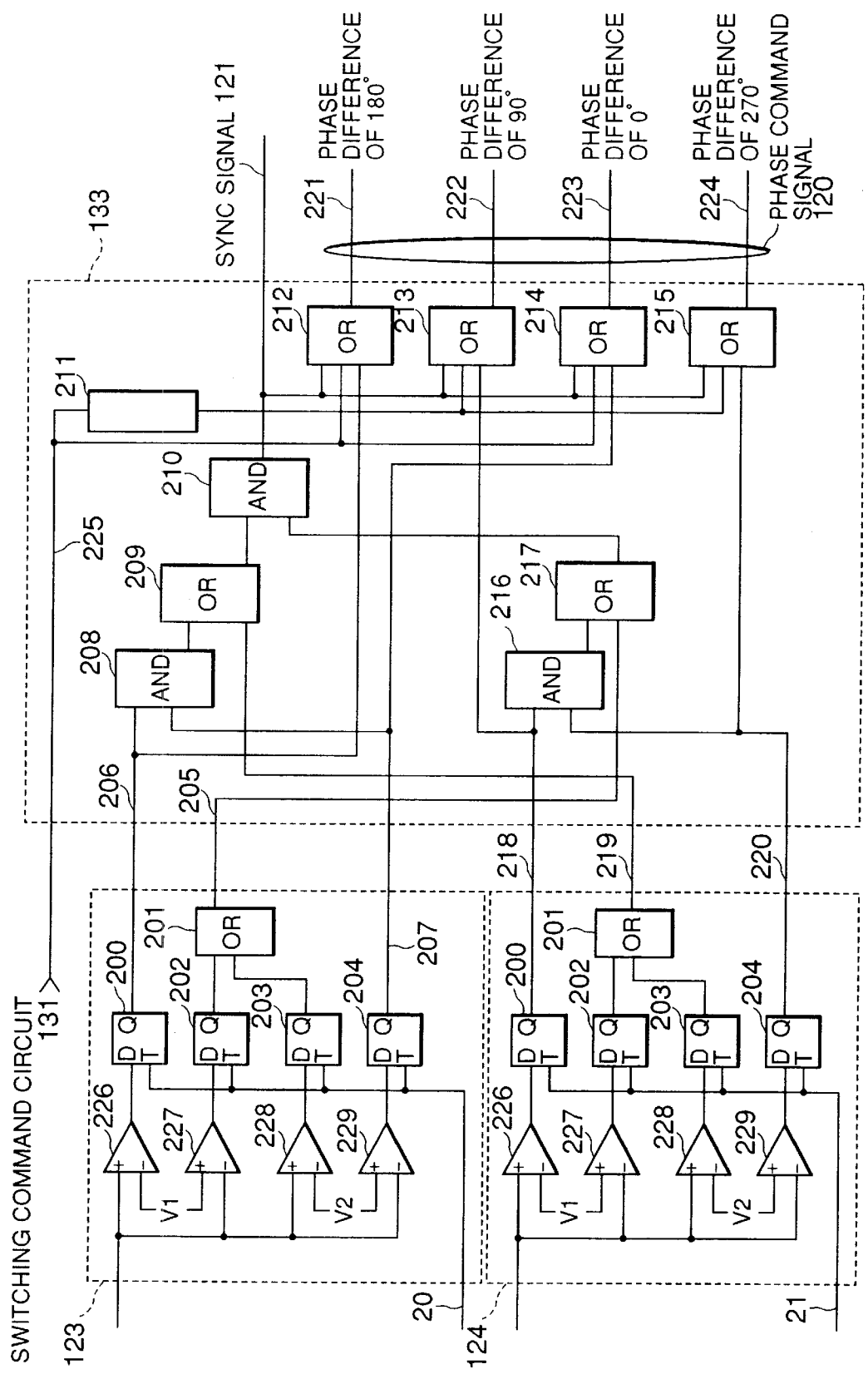
FIG. 12 is a block diagram showing a more detailed circuit structure of a part of the circuit of FIG. 11A.

Out of detection signals 231, a detection signal 231 from ordinary address information 13 and a detection signal 231 from the SYNC segment are separated by using a sync detection circuit 133. Specifically, with a detection signal 231 of ordinary address information 13, regardless of what phase the detection signal 231 has, both synchronous detectors 42, 43 provide a positive or negative level of output. However, on the SYNC segment, only one of the synchronous detectors 42, 43 provides a positive or negative level of output, and the other detector provides zero output. Therefore, since level decision circuits 123, 124 identify the area where either one of outputs of the synchronous detectors 42, 43 becomes zero, the SYNC segment can be detected. FIG. 12 shows detail of the level decision circuits 123, 124. A signal from synchronous detector 42 is compared with a positive level v1 and a negative level v2 by comparators 226, 227, 228, and 229 in the level decision circuits 123, 124. If output of the synchronous detector 42 is larger than v1, a level "1" signal synchronous with the reference signal 420 appears at an output signal 206 of a flip-flop 200. If output of the synchronous detector 42 is between v1 and v2, in other words, if output of the synchronous detector 42 is close to zero, a level "1" signal synchronous with the reference signal 420 appears at a signal 205 after passing through flip-flops 202, 203, and an AND circuit 201. Similarly, if output of the synchronous detector 42 is smaller than v2, a level "1" signal appears at a signal 207 from a flip-flop 204.

The detailed operation of the level decision circuit 123 has been described. Similarly, in the level decision circuit 124, if output of a synchronous detector 43 is larger than v1, a level "1" signal synchronous with the reference signal 421 appears at a signal 218. If output of the synchronous detector 43 is between v1 and v2, a signal "1" signal synchronous with the reference signal 421 appears at a signal 219, and, if output of the synchronous detector 43 is smaller than v2, a level "1" signal appears at a signal 220.

Signals 206, 207 or signals 218, 220 showing if output is larger than v1 or smaller than v2 are ORed by the logical OR circuits 208, 216. The results of these logical operations and signals 205, 219 showing zero of the decision circuits 123, 124 are ANDed by the logical AND circuits 209, 217. When the results of those logical operations are ORed by the logical OR circuit 210, a sync signal 121, which shows that the detection signal 231 is a signal from the SYNC segment, can be obtained.

When the SYNC segment is detected as mentioned above, signals for reference signals 420, 421 can be selected from the signals with four phases mentioned earlier, using the detection signal 231 from the SYNC segment.

Description will be made of the principle for selecting signals for the reference signals 420 421 from signals with four phases. Since the reference signal 421 is 90 degrees out of phase with the reference signal 420, if the phase of the reference signal 420 is decided, it follows that the phase of the reference signal 421 can be decided. One of the signals of four kinds of phases 0 degree, 90 degrees, 180 degrees and 270 degrees generated by the frequency divider 127, to take an example, a signal with the phase of 0 degrees is input from the synchronous signal generator 41 into the synchronous detector 42 as a reference signal 420. A signal 90 degrees out of phase with the reference signal 420, that is, a signal of a phase of 90 degrees is input to the synchronous detector 43 as a reference signal 421. Since the SYNC segment is formed such that the wobbling waveform of the inner circumference side border 14 and the wobbling waveform of the outer circumference side border 15 are in phase with each other, either one of the outputs of the synchronous detectors 42, 43 in FIG. 5A in relation to the SYNC segment is zero, and the other output becomes a positive or a negative level. At this time, there are two factors for deciding if either one of outputs is zero, positive or negative: one is the phase of the wobbling waveform in the SYNC segment and the other is the position at which the reproducing beam spot 1 is located, i.e. the groove tracks, 270, etc. or the land tracks 271, etc.

Accordingly, since the wobbling waveform of the SYNC segment is already known, by selecting a groove track 270 or the like or a land track 271 or the like, by positioning the beam spot at the selected track using the tracking control system 132 and the tracking polarity switching circuit 130 included in the tracking control circuit 1300, and by knowing which of the outputs of the synchronous detectors 42, 43 is 0, it can be decided whether the phase relationship between the reference signal 420 which was input and the reference signal 420 to be input is 0 degrees or 180 degrees, or 90 degrees or 270 degrees.

For example, when the phase relationship is known to be 0 or 180 degrees by the above decision, by further detecting if a non-zero output from the outputs of the synchronous detectors 42, 43 is positive or negative, a further decision can be made as to whether the phase relationship is 0 degrees or 180 degrees. Similarly, if the phase relation is known to be 90 degrees or 270 degrees by the above decision, a further decision can be made as to whether the phase relationship is 90 degrees or 270 degrees.

The above-mentioned decisions can be made by a circuit block as shown in FIG. 12. In FIG. 12, the switching command circuit 131 is a part of the mechanical controller 1303, and switches over the selection of the groove track, such as 270, or the land track, such as 271. The logical AND operations are carried out by AND circuits 212, 213, 214 and 215 between, on one hand, a signal 225 of a polarity which indicates whether the track, such as 270, selected by the switching command circuit 131 is a groove or a land, and, on the other hand, signals 206, 207, 218, and 220 showing the synchronous detector output level being larger than v1 or smaller than v2, as detected by the level decision circuits 123 and 124. Note that one of the signals with four kinds of phases of 0 degrees, 90 degrees, 180 degrees, and 270 degrees, produced by the above-mentioned frequency divider 127, that is, a signal of a phase of 0 degrees, for example, is input as a reference signal 420 from the synchronous signal generator 41 to the synchronous detector 42. As the reference signal 421, a signal which is 90 degrees out of phase with the reference signal 420 is input to the synchronous detector 43.

In the circuit of FIG. 12, when the reference signal 420 currently being input is 0 degree out of phase (in other words, in synchronism) with a correct signal which should have been input as the reference signal 420, the signal 221 is at the level of "1", or when the phase difference is 90 degrees, the signal 222 is at the level "1", or when the phase difference is 180 degrees, the signal 233 is at "1", or when the phase difference is 270 degrees, the signal 224 is at "1". Thus, in the phase command signal 120 consisting of signals 221 to 224, by detecting which signal is at the level "1", a decision can be made as to how the phase of the reference signal 420 currently being input is shifted from the phase of a reference signal 420 which is correct and should have been input.

By inputting the phase command signal 120 into the selector 128 and having the selector 128 select any of the four signals with different phases, which are generated by the phase divider 127, a correct reference signal 420 can be selected. For example, when the signal 222 which is 90 degrees out of phase with a correct phase is at the level "1" in the phase command signal 120, the selector 128 selects a signal formed by adding a phase of 270 degrees to the reference signal 420 currently being input, and the synchronous detector 42 outputs this signal as the reference signal 420. On the other hand, as the reference signal 421, a signal obtained by adding 90 degrees to the reference signal 420 is output.

Thus, reference signals 420, 421 can be formed from the wobbling waveform detection signal 231 of the borders 14, 15, The reference signals 420, 421 vary in accordance with variation in the linear velocity of the reproducing beam spot on the tracks 270, etc. due to the variation in the number of revolutions of the current optical disk 4 or the eccentricity of the optical disk 4, and so on. Therefore, by using the reference signals 420, 421, the information marks 274 and the address information 13 can be accurately demodulated.

Description will now be made of the method of generating a recording and a reproducing clock signal used when recording and reproducing data from the wobbling waveforms of the borders 14, 15 on the tracks 270, etc. Applied to this method is the fact that the oscillation frequency of PLL 126 in FIG. 11 is 4t times the wobbling frequency as described above. More specifically, the oscillation frequency of PLL 126 is multiplied by a specified number. For example, if the wobbling frequency of the borders 14, 15 is set at 7.5 kHz or so and the frequency of a recording or reproducing clock signal is set at 7.5 MHz, then the oscillation frequency of the PLL 126 is 4t times the wobbling waveforms, namely, 150 kHz. By multiplying this 150 kHz by a specified number (e.g., 50), a recording signal or a reproducing clock signal can be produced. When this recording or reproducing clock signal is used, even if the linear velocity of the recording and reproducing beam spot 1 on the tracks 270, etc. varies due to a minute variation in the number of revolutions of the optical disk 4, and the accentricity of the optical disk 4, information marks 274 can be recorded and reproduced.

Subsequently, description will be made of the method of reproducing address information 13 and the circuit structure for reproduction according to a fourth embodiment of the present invention.

In the third embodiment of the present invention, it is necessary to decide the phases of the reference signals 420, 421 for use in detecting address information 13, but in the fourth embodiment, address information is detected without deciding the phases.

In the fourth embodiment of the present invention, a composite waveform of the waveforms of the inner circumference side border 14, and the outer circumference side border 15 of each track 270, for example is detected for each bit. When recording address information 13, in other words, when tracks are formed on the original disk 68 by the light exposure process, it is arranged that the phase of the composite waveform of the subsequent bit is shifted by an amount decided by a predetermined rule from the phase of the preceding bit, and address information 13 is recorded utilizing the phase difference between the composite waveforms. The actual wobbling waveforms of the borders 14, 15 are formed as waveforms obtained by decomposing the composite waveform. When reproducing address information 13, the phase of the composite waveform of each bit is detected, and a phase difference from the preceding bit is obtained by using the differential detector 38, and the band filter 39. By collating the obtained phase difference with the above-mentioned rule, address information is reproduced.

Description of this will now be given in more detail. Data "1" and "2" represented by the borders 14, 15 of the tracks 270, etc. are combined to form pairs of data of the inner circumference side border and data of the outer circumference side border. The result is that data of a given bit is any one of the following four cases: a case of "0" on the inner circumference side border and "0" on the outer circumference side border; a case of "0" on the inner circumference side border and "1" on the outer circumference side border; a case of "1" on the inner circumference side border and "0" on the outer circumference side border; a case of "1" on the inner circumference side border and "1" on the outer circumference side border. The phases of the composite waveforms differ among all of the above fours pairs. In the fourth embodiment, by using this, in relation to the phase of the composite waveform of the preceding bit, the degree of shift in the phase of the composite waveform of the next bit is set for various pairs of the composite waveforms arranged in a row. The phase differences and the corresponding pairs of the composite waveforms are formulated as a rule.

Figure 14A:
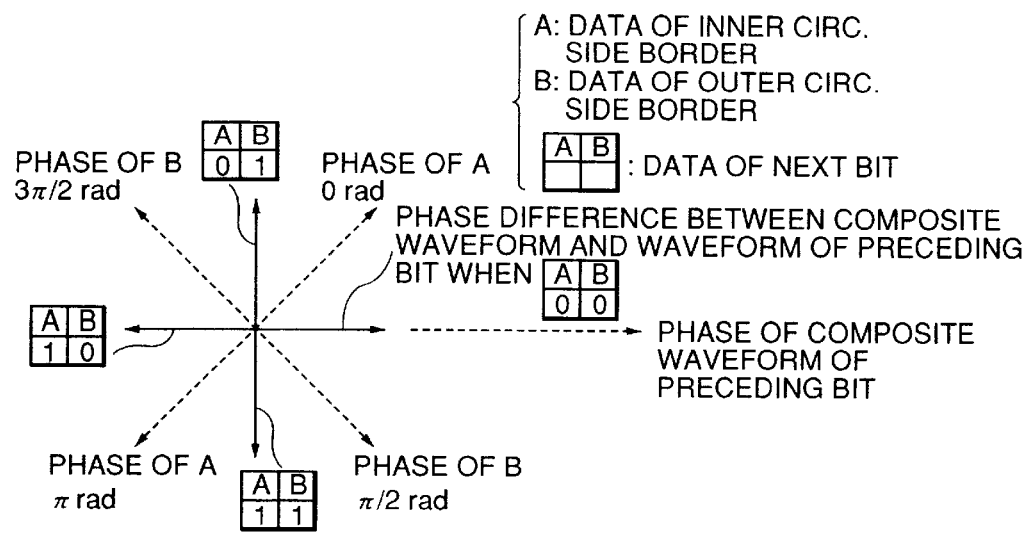
FIG. 14A is an explanatory diagram showing a modulation rule used in the method of recording or reproducing address information on the optical disk according to a fourth embodiment of the present invention.

FIG. 14A is an example of the rule. To be more specific, when data "0" is recorded at the inner circumference side border and data "0" at the outer circumference side border at a given bit, the phase of the composite waveform for this bit is set to be the same as the phase of the composite waveform of the preceding bit. Alternatively, when data "0" is recorded at the inner circumference side border and data "1" at the outer circumference side border, the phase of the composite waveform of this bit is set to lead $\pi/2$ rad on the phase of the composite waveform of the preceding bit. When data "1" is recorded at the inner circumference side border and data "0" at the outer circumference side, the phase of the composite waveform of this bit is set to lead $\pi$ rad on the phase of composite waveform of the preceding bit. When "1" is recorded at the inner circumference side border and "1" at the outer circumference side border, the phase of the composite waveform of this bit is set to lead $3\pi/2$ rad on the phase of the composite waveform of the preceding bit.

When an original disk 68 is prepared, the phase of the composite waveform representing data of address information is obtained according to this rule, and by decomposing this composite waveform, the wobbling waveforms of the borders 14, 15 are determined. As has been described with reference to FIGS. 24A, 24B and 24C, the detection signal 231 (FIG. 24C) output from the band filter 39 is a composite waveform of the wobbling waveform of the inner circumference side and the wobbling waveform of the outer circumference side of the track. Therefore, by detecting the amount of shift of the phase of the detection signal 231 from the preceding bit, data of the inner circumference side border and data of the outer circumference side border can be reproduced together as a combination of data only from the phase difference.

Figure 14B:
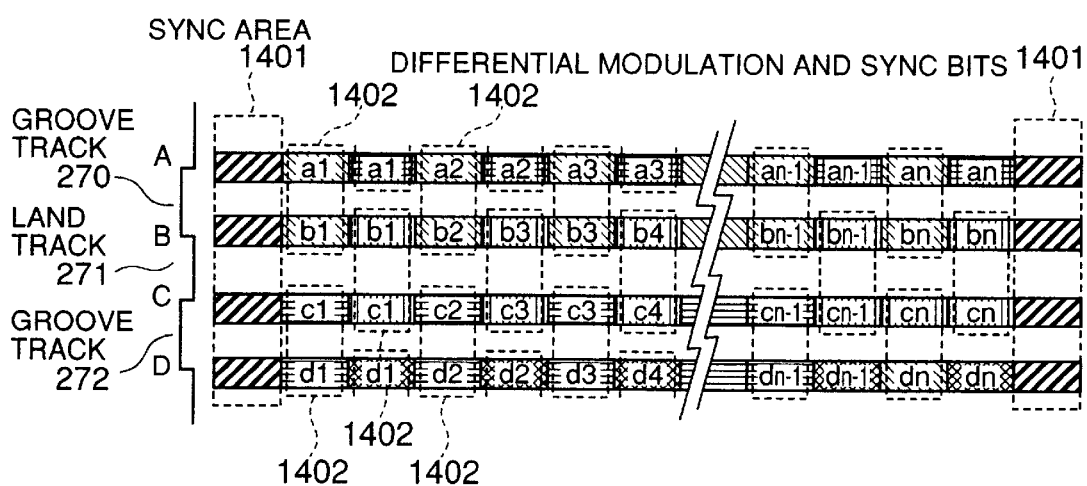
FIG. 14B is an explanatory diagram for explaining bit combinations on the track borders, used in the recording or reproducing method of FIG. 14A.

However, since data of the border is shared by the groove track, such as 270, and the land track, such as 271, if data is to be recorded according to the above rule in a combination of the inner circumference side border 14 and the outer circumference side border 15 of the groove track side 270, it is impossible to record data of the same bit on the land track side 271 because of the above rule. Therefore, as indicated by the broken line in FIG. 14B, the inner and outer borders are combined in a pair 1402 of the groove track side 270 etc. and the land track side 271 etc. at every other bit. Like the SYNC segment in the preceding embodiment, synchronous segments 1401, by which the phases of the inner circumference side border and the outer circumference side border are matched, are provided at fixed intervals, When reproducing the composite waveform of the pair 1402, this synchronous segment 1401 is detected, and by counting down the clocks on the basis of this synchronous segment, signals indicating the bit areas are formed, and by using the bit indication signals, the pair 1402 on the groove track, such as 270, and the pair 1402 on the land track, such as 271, are separated and detected.

Description will be continued with reference to an illustrative example. For example, as shown in FIG. 19, data "0" or "1" of address information 13 is going to be recorded at the borders of the tracks. Supposing that data at the inner circumference side border 14 of the groove track 270 is denoted by A, and data at the outer circumference side border 15 is denoted by B, then the first bit is (0, 0) for (A, B). Suppose that (1,0) is going to be recorded at the next bit. In this case, it is necessary to record a composite waveform which is by $\pi$ out of phase with the composite waveform of the preceding bit. Accordingly, if the phase of the composite waveform of the preceding bit (0, 0) is 0, the phase of the composite waveform of bit (1, 0) is $\pi$, so that the phases of the wobbling waveforms of each border are as shown in FIG. 19. If (0, 1) is recorded next to (1, 0), it is required to record a composite waveform which is $\pi/2$ out of phase with the composite waveform of the preceding bit. Hence, the phases of the composite waveform of bit (0, 1) and the wobbling waveforms of the borders are as shown in FIG. 19. After this, by deciding the phases of the composite waveforms, the phases of the wobbling waveforms of the borders can be decided.

Meanwhile, in reproduction, like in the preceding embodiment, a clock signal is generated which has a frequency four times the wobbling frequencies of the borders 14, 15 of the track, and by dividing the frequency of the clock signal, reference signals 420, 421 for synchronous detection are produced. The phase may take four states, but any phase may be used. The reason for this is as follows. The reason for this is that, since data can be reproduced only from the phase difference of the composite waveform, the only thing required first of all is to find the phase of the composite waveform of the first bit, and thereafter data can be reproduced using a difference from the preceding bit. In this case, if the phases of the reference signals 420, 421 are not selected correctly, data at the first bit cannot be read correctly, but from the next bit onward correct data can be reproduced. Because address information 13 can be recorded repeatedly at the borders of one track 270, for example, there is no problem even if data at the first bit cannot be read correctly. By performing synchronous detection by varying the phases of the reference signals 420, 421 according to data of reproduced address information 13, it is possible to generate reference signals 420, 421 of correct phases on the basis of the phase of the previous data.

Figure 13:
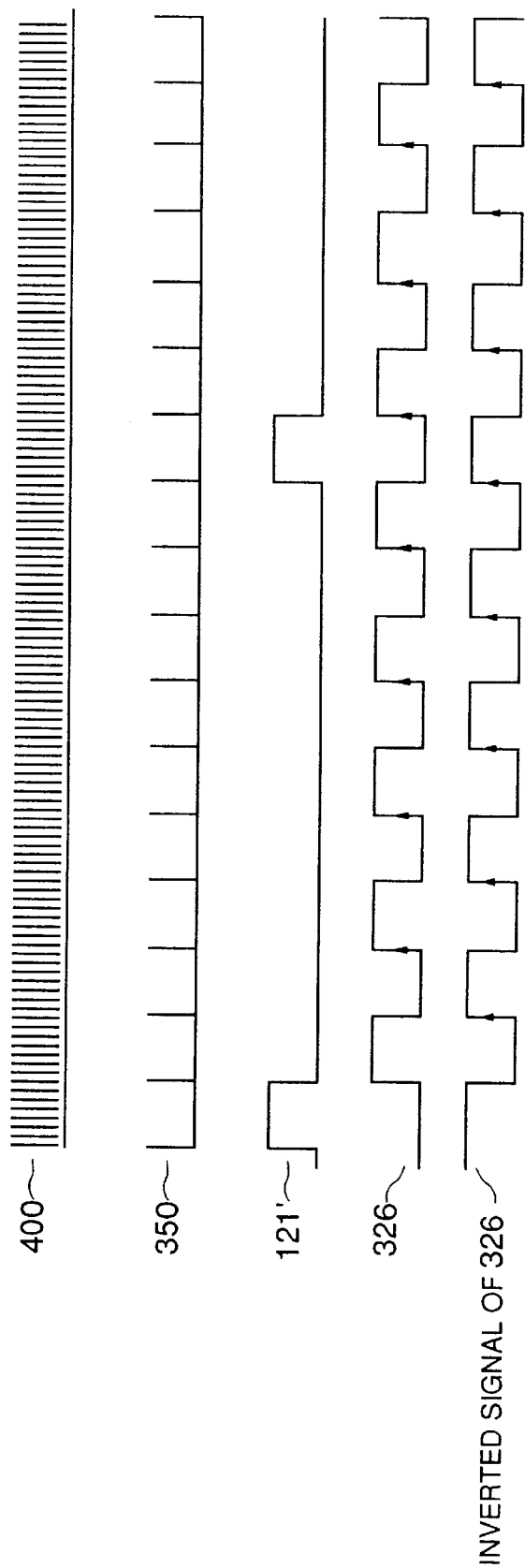
FIG. 13 is an explanatory diagram showing waveforms of signals used in the circuit of FIG. 15A.
Figure 16:
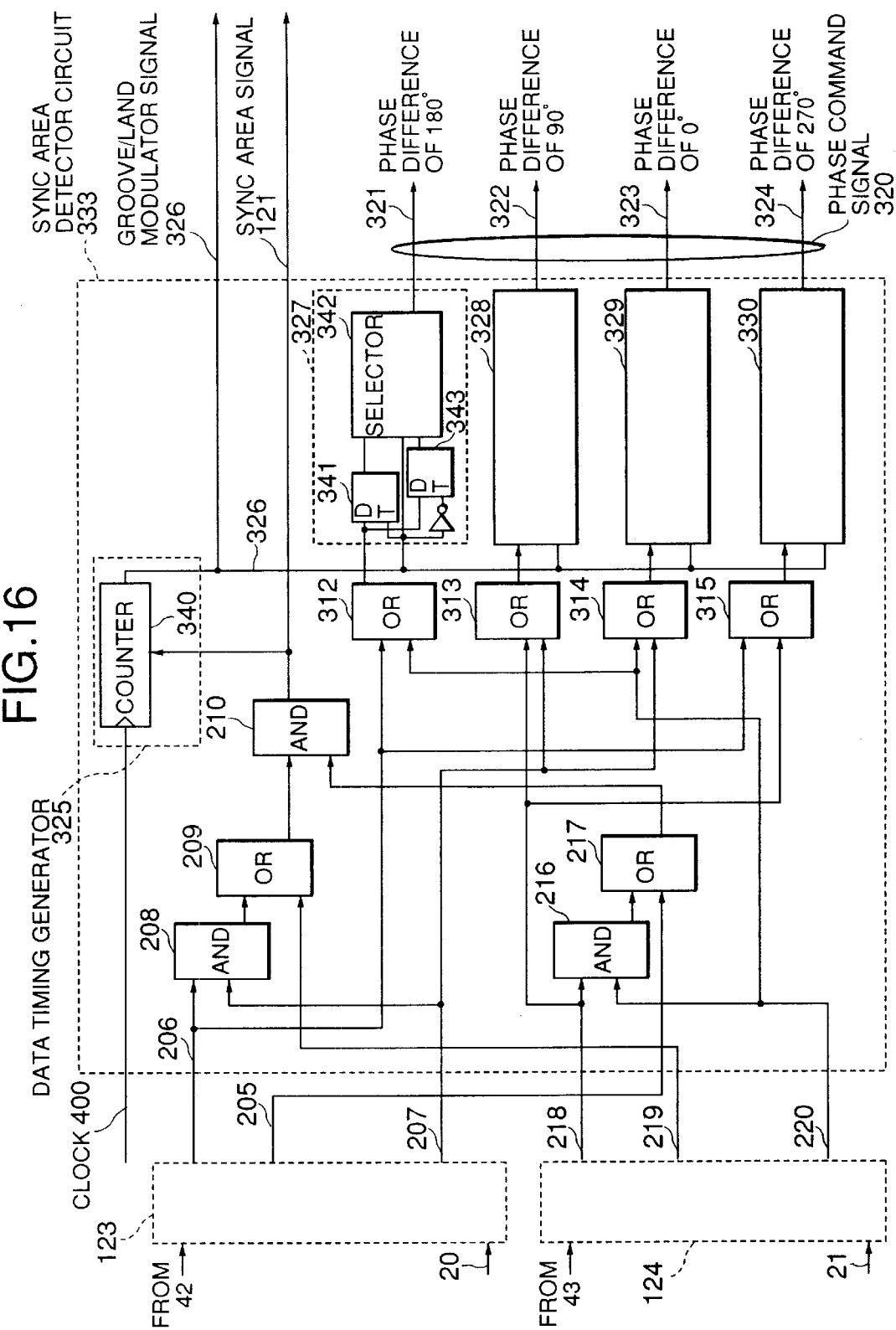
FIG. 16 is a block diagram showing a more detailed structure of a part of the circuit of FIG. 15A.

FIGS. 15 and 16 are circuit block diagrams for demodulating address data according to the address information reproducing method mentioned above. The synchronous segment detection circuit 333, just as in sync signal detection by the detection circuit 133 in the third embodiment, detects the synchronous segment 1401, and outputs a synchronous segment signal 121' in FIG. 13. The synchronous sync detection circuit 333 generates a groove/land modulator signal 326 from a signal which has detected the synchronous segment 1401. The groove/land modulator signal 326 is a modulation signal to indicate whether the pair 1402 for a bit is on the groove track, such as 270, or on the land track, such as 271. Those two signals are input to the address demodulator circuit 422, and are used as timing signals in demodulating data. The address demodulator 422a receives outputs from the synchronous detectors 42, 43 in the form of binary signals to which those outputs have been converted by the comparators 44, 45. The address demodulator 422a, according to timing controlled by the synchronous segment signal 121' and the groove/land modulator signal 326, separates address information of a data pair at a groove track, such as 270, and a data pair at a land track, such as 271, to thereby reproduce (demodulate) data according to the above-mentioned rule.

Description will now move on to the detailed circuit structure and the operation of the synchronous detection circuit 333. As has been described, the synchronous detection circuit, using the same circuit structure and operation as in the sync detection circuit 133, generates a synchronous segment signal 121' shown in FIG. 16. The synchronous detection circuit 333 divides the frequency of the clock signal in the counter 340 of the data timing generator 325 by using the synchronous segment signal 121' and the clock signal 400 to thereby generate a signal 350 (FIG. 13) corresponding to bit periods, and subdivides the signal 350 by half, and generates a groove/land modulator signal 326 in synchronism with the synchronous segment signal 121'. The synchronous detection circuit 333 generates signals to detect the phases of the composite waveforms of each bit by performing logical operations at the circuits 208, 209, 210, 216, 217, 312, 313, 314, and 315 using binary signals 205, 206, 207, 218, 219, and 220 converted from outputs of the synchronous detectors 42, 43. The synchronous segment detection circuit 333 associates the outputs of the AND circuits 312, 313, 314, and 315 with four kinds of data of the pairs 1402, and inputs the results to memories 327, 328, 329 and 330. The memories 327, 328, 329 and 330 store the phases of the pairs 1402 on the groove tracks, such as 270, and the phases of the pairs 1402 on the land tracks, such as 271, and reads out the preceding phase when data of the next pair on the same track is demodulated.

The detailed structure of the memories 327 to 330 will be described with reference to the memory 327 as an example. The memory 327 takes the output of the AND circuit 312 into the flip-flop circuits 341 and 343 respectively at the leading edge of the groove/land modulator signal 326 and at the leading edge of the inverted signal of the groove/land modulator signal 326, and sends out the output as it is selected by the selector 342 according to the polarity of the groove/land demodulator signal 326. The output of the memories 327, 328, 329, and 330 is used as a phase command signal 320 to select signals of correct phases by controlling the selector 428 to produce reference signals 420, 421 of correct phases.

Description will be made of the method of reproducing address information 13 and the circuit structure for reproduction according to a fifth embodiment of the present invention.

In the preceding embodiment, data on both borders 14, 15 of each track, such as 270 is recorded and reproduced as data in a pair 1402 for every bit. In the fifth embodiment of the present invention, data on the borders 14, 15 of a track, such as 270, is independently modulated and recorded. To be more specific, data for a bit on the inner circumference side border 14 of a track 270, for example, is recorded by a phase difference with respect to the wobbling waveform of data at the preceding bit. The phase differences with respective pieces of data should be decided as a rule in advance as shown in FIG. 17A. The rule in FIG. 17A is as follows: When data at the next bit is "0" on a certain border 14, or 15 regardless of whether data at the preceding bit is "0" or "1", a wobbling waveform of the same phase as in the wobbling waveform at the preceding bit should be set, and when data at the next bit is "1", a wobbling waveform of a phase leading by m on the phase of the wobbling waveform at the preceding bit should be set. When data is represented with a phase difference of a wobbling waveform for each border 14, if it is clear which of outputs of the synchronous detectors 42, 43 is data on the inner circumference side border of a track, such as 270 and which of outputs is data on the outer circumference side border, then separate items of data which correspond to the synchronous detectors 42, 43 can be detected even though the phases of the reference signals 420, 421 are 180 degrees out of phase with each other.

Note that the SYNC segments having the same wobbling waveform on the inner and outer circumference side borders are provided at fixed periods also in this fifth embodiment.

In order to decide which of the synchronous detectors 42, 43 outputs data on the inner circumference side of the track and which of those detectors 42, 43 outputs data on the outer circumference side of the track, it is only necessary to use the methods of sync detection and phase decision of the reference signals described with reference to FIGS. 11 and 12. In other words, since the phase of the wobbling waveform in the SYNC segment has already been decided, and depending on whether the location of the beam spot 1 is on a groove track or on a land track, the polarity of outputs of the synchronous detectors 42, 43 is detected when the phases of the reference signals 420, 421 are zero. Therefore, by detecting the polarity of the level of output of the synchronous detectors 42, 43, the phases of the reference signals 420, 421 can be decided correctly.

In the fifth embodiment in FIG. 17, instead of the above-mentioned SYNC segment or synchronous segment 1401, data for synchronization may be recorded at fixed periods on both borders 14, 15. For example, as shown in FIG. 18A, two synchronous bits 1811 are secured in fixed periods, in which data "01" is recorded, for example, to show that those two bits are for synchronization purpose. By this arrangement, the sync bits 1811 can be detected regardless of the state of phase by the same detection principle as in the embodiment in FIG. 17. The frequency of the timing signal for detecting the sync bits 1811 may be divided to generate a reproducing clock signal or a recording clock signal. When output of the synchronous bits 1811 is zero, the area where output of the synchronous detector 42 or 43 is zero is detected by the level decision detectors, so that the uncertainty of the phases of the reference signals 420, 421 is reduced by half. In other words, it is known which side the track the synchronous detectors 42, 43 correspond to, the inner circumference side or the outer circumference side. Also in the fifth embodiment in FIG. 17, as shown in FIG. 18B, like in the case of the synchronous segment 1401, by inserting bit 1812 of a predetermined phase at fixed intervals in data, a reproducing clock signal or a recording clock signal can be generated from a signal of this bit 1812. In addition, timing by which to correctly set the phases of the reference signals 420, 421 is increased, so that recovery from loss of synchronism can be achieved quickly, thereby enhancing reliability.

Finally, description will be made of a sixth embodiment of the present invention.

In this embodiment, the method of detecting a track shift signal without offset will be discussed.

Figure 20:
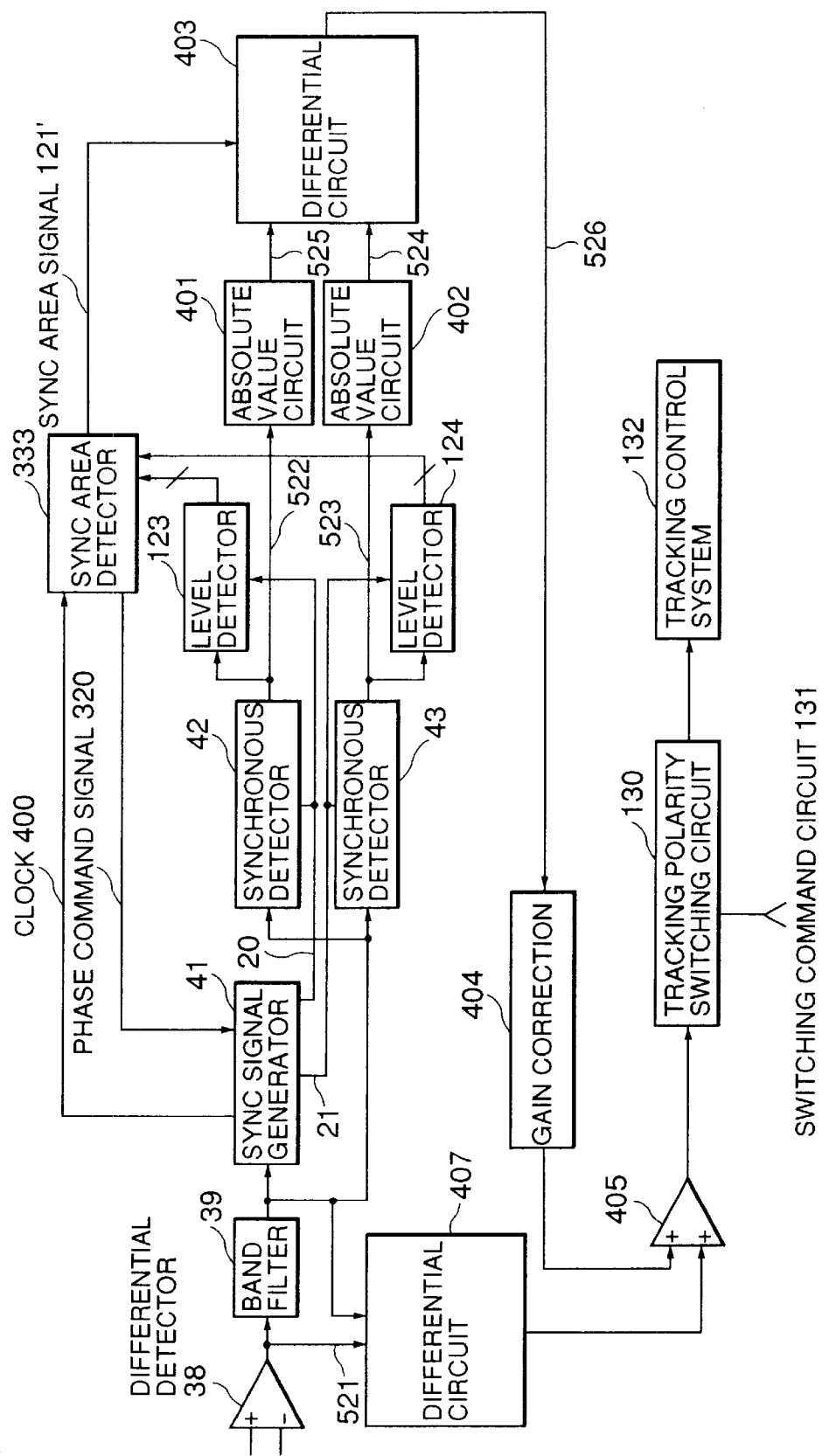
FIG. 20 is a block diagram showing a circuit structure for detecting a track shift signal from a detection signal of address information on the optical disk according to a sixth embodiment of the present invention.

When the reproducing beam spot goes across a track, output of the differential detector 38, shown in FIG. 20, which has a similar circuit structure as in FIG. 5A is represented by the signal 521 in FIG. 21, having a wobbling frequency component (the dotted line) superimposed on the track shift signal (the solid line). At this time, as the center of the beam on the two-piece detector 33 of FIG. 5A deviates from the split center of the two-piece detector 33, offset occurs in the signal 512 of FIG. 21, and the position of the zero point of the track shift signal shifts from the center of the track, such as 270. Only the wobbling frequency component is extracted from the signal 521 by the band filter 39, then signals 522 and 523 are obtained as outputs of the synchronous detectors 42, 43. Specifically, the wobbling frequency component corresponding to the phase of the waveform at the inner circumference side border 14 of the groove track 270, for example, has a large absolute amplitude on the inner circumference side of the groove track, such as 270, and the absolute values of the outputs are greatest on the inner circumference side border 14 and smallest on the outer circumference side 15 of the groove track, such as 270. The wobbling frequency component corresponding to the phase of the outer circumference side border of the groove track, such as 270, has a large absolute amplitude on the outer circumference side of the groove track, such as 270, and the absolute values of the outputs are greatest on the outer circumference side border 15 and smallest on the inner circumference side border 14 of the track, such as 270.

Therefore, when those absolute values are captured by the absolute value detectors 401, 402 of FIG. 20, the signals 524, 525 are detected as the beam spot moves. When a difference between those signals is acquired by the differential circuit 403, a track shift signal 526 without offset can be detected. By using this signal for tracking control, tracking control can be performed with high accuracy.

Also, by using this signal, a track shift signal with offset can be corrected. The wobbling frequency component extracted from the signal 521 by is removed by the differential circuit 407 to generate a track shift signal which includes only an offset component. Thereafter, gain of the signal 526 is corrected by the gain correction circuit 404, and signals are added by the adder 405 with their polarities matched, to thereby correct the offset component. As the offset correction method, a well-known method may be adopted. The track shift signal after the correction process has its track shift polarity switched according to the polarity shift instruction of the land and groove tracks using the tracking polarity switching circuit 130, and sent to the tracking control circuit 132.

As has been described, in the optical disk 4 according to each of the above-mentioned embodiments, the inner and outer circumference side borders 14, 15 of each track, such as 270 are wobbled with different phases to record different items of address information 13 on the inner and outer circumference side borders 14, 15. Therefore, even if the diameter of the beam spot 1 during reproduction is larger than the track width and the beam spot 1 extends over the tracks on both sides of the track from which data is to be read, the track can be identified by address information which has been read out. Accordingly, even if the track width is about one-half of the diameter of the beam spot 1, the track can be identified accurately to read information. Also in recording, the track can be identified correctly to record information marks 274.

With the optical disk 4 in those embodiments of the present invention, even in the area where address information 13 has been recorded by wobbling of the borders 14, 15 of the track, such as 270, and the borders 14, 15 of the track 270, for example, have wobbling waveforms, user data or the like can be recorded by using information marks 274. For this reason, it it not necessary to provide areas dedicated to recording of address information 13 on the optical disk 4. Therefore, since it it not necessary to use, for example, the VFO unit for use when reading address information 13, the user data recording efficiency can be improved compared with the case of using address information recorded in the conventional preformatted header.

Furthermore, in the embodiment shown in FIG. 11, for example, a clock signal can be generated from the wobbling waveform on the track, such as 270, so that the sync area 12 is not required, thus making it possible to improve the recording efficiency of user data.

Description will be made of the user data recording efficiency of the optical disk 4 in this embodiment by comparing with the prior art. In this embodiment, address information 13 is recorded on borders on both sides of a track, and therefore it is not necessary to secure on the track the areas for preformatting address information (ID) 259 as in the conventional ISO format in FIG. 25. Since the address information (ID) segment 259 is not required, those segments arranged to read the address information segment 259, such as the VFO segment 257, the address mark segment 258, and the PA segment 263, become unnecessary. The sector mark (SM) segment 256 also becomes unnecessary because the same function is performed by the sync area 12, SYNC segment, or the sync segment 1401 in this embodiment. Further, in this embodiment, a reproducing clock signal can be generated from the sync area 12 or the wobbling waveforms of the track, and therefore the VFO segment 252 and the RESYNC segment 268 in FIG. 25 become unnecessary. The clock generated from a signal from the sync area 12 may be used as a recording clock signal. Therefore, even when a variation occurs in the rotating speed of the optical disk rotating motor, information marks can be recorded at a fixed frequency, so that the buffer 255 becomes unnecessary.

Figure 25:
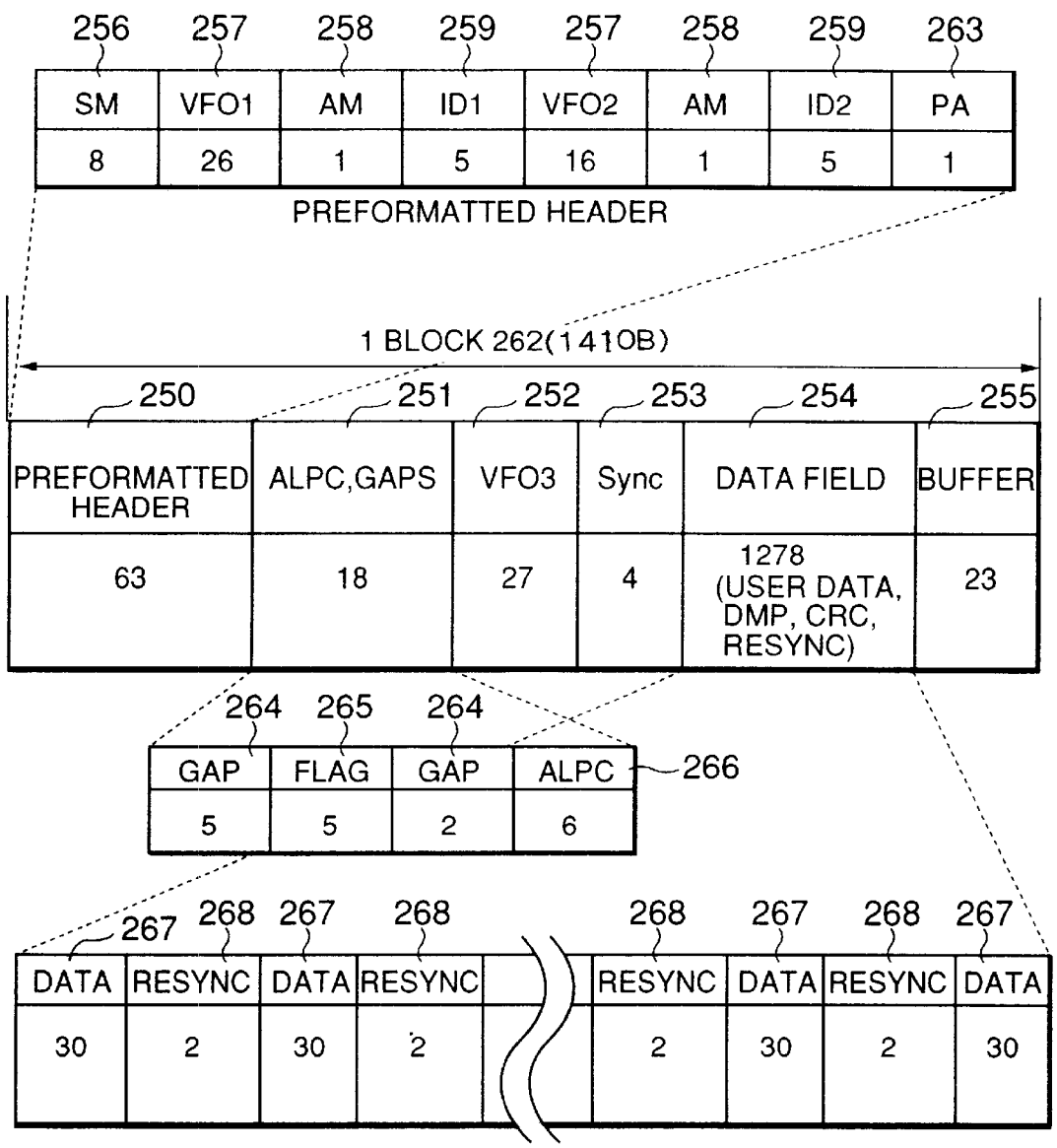
FIG. 25 is an explanatory diagram showing an example of ISO format of the conventional magnetooptical disk.
Figure 26:
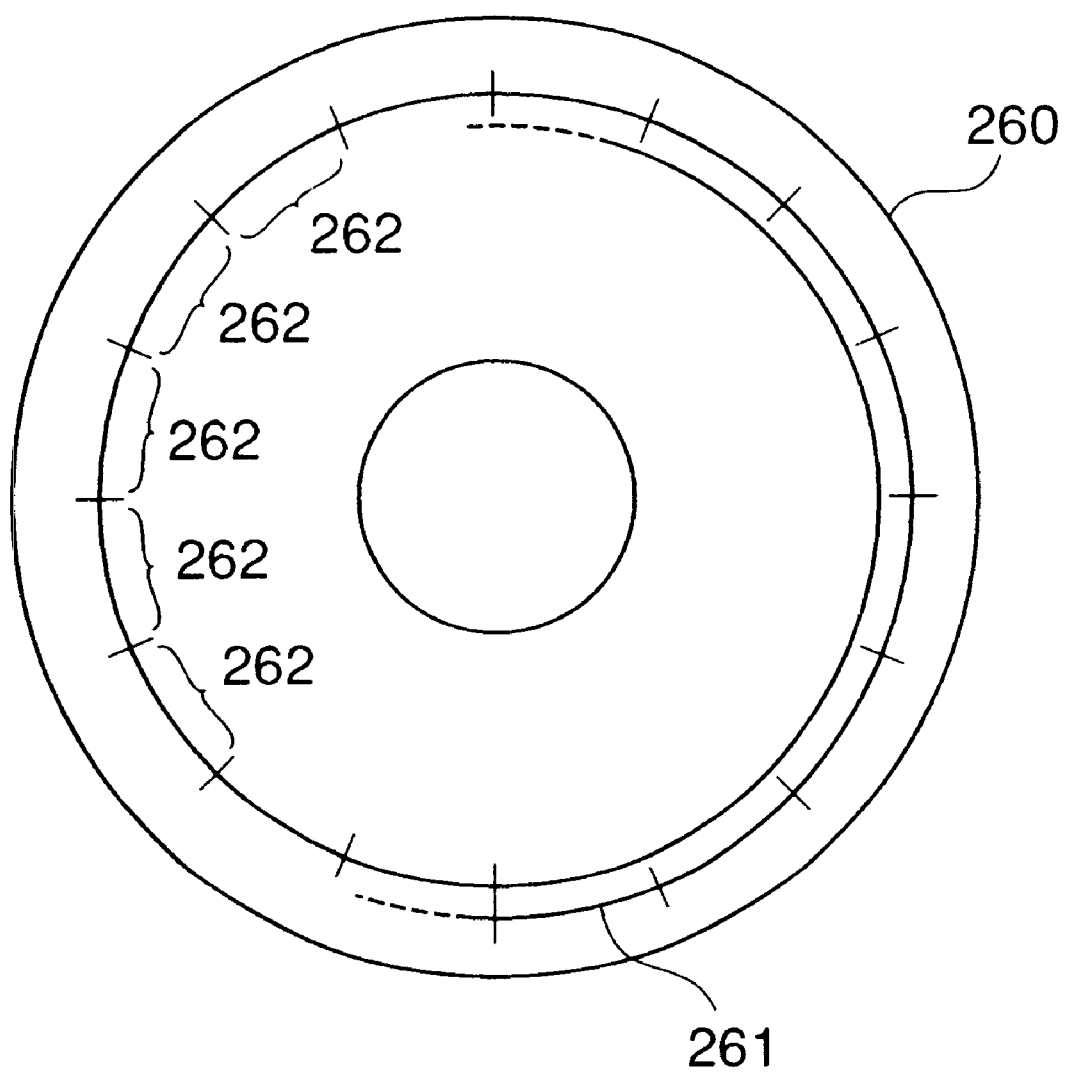
FIG. 26 is an explanatory diagram showing a relationship between the tracks and the blocks of the conventional optical disk.

Accordingly, in the optical disk 4 in this embodiment, out of the conventional format in FIG. 25, 63 bytes of the preformatted header 250, 69 bytes of the VFO segments 257, 252, 23 bytes of the buffer segment 255, and 78 bytes of the RESYNC segment 268 become unnecessary. As a result, the data recording efficiency of user data is 1014/1219 bytes, namely 84%. Note that in the conventional ISO format in FIG. 25, the data recording efficiency of user data is 1024/1410, namely 72.6%

In the third embodiment in FIG. 11, since a recording clock signal is generated from the wobbling waveform, the sync area 12 is not required, and thus the data recording efficiency can be further improved.

Therefore, according to the present invention, the user data recording efficiency of the optical disk 4 can be increased to at least 80% so that the data recording efficiency can be raised to an extremely high efficiency.

As is clear from the foregoing description, according to the present invention, there is provided an information recording medium with an improved track density, which has address information recorded in advance so that information can be recorded or reproduced on a target track securely in recording or reproducing data. Also, an information reproducing method and an information reproducing apparatus capable of reproducing information from the information recording medium according to the present invention are provided. Moreover, a track forming method and a track forming apparatus can be provided for forming a track on the information recording medium according to the present invention.

What is claimed is:

1. A manufacturing method for a stamper for an information recording medium, comprising the steps of:

driving an original disk;

irradiating a beam for exposure on the original disk;

performing exposure to light in a shape of a track by scanning the beam in a radial direction of the original disk;

controlling a width of the scanning so that borders on both sides of the track are shifted in phase from each other with a phase difference;

developing the original disk to form the track; and transferring a shape of a surface of the original disk to a stamper.

2. A manufacturing method according to claim 1, wherein the phase difference is a predetermined phase difference.

3. A manufacturing method according to claim 1, wherein the borders on both sides of the track have a wobbling shape which is indicative of information.

4. A manufacturing method according to claim 3, wherein the information includes address information of the track.

5. A manufacturing method according to claim 1, wherein the track is a groove track.

6. A manufacturing method for a stamper for an information recording medium, comprising the steps of:

rotating an original disk;

irradiating a light beam onto the original disk;

scanning the light beam in a radial direction of the original disk so as to expose the original disk to the scanned light beam in a shape of a track;

controlling a width of the scanning so that borders on both sides of the track are shifted in phase from each other with a phase difference;

developing the original disk to form the track; and transferring the shape of a surface of the original disk to a stamper.

7. A manufacturing method according to claim 6, wherein the phase difference is a predetermined phase difference.

8. A manufacturing method according to claim 6, wherein the borders on both sides of the track have a wobbling shape which is indicative of information.

9. A manufacturing method according to claim 8, wherein the information includes address information of the track.

10. A manufacturing method according to claim 6, wherein the track is a groove track.

* * * * *